United States Patent [19]

Buck et al.

[11] 4,453,825

[45] Jun. 12, 1984

[54] DISTANCE TRANSDUCER

[75] Inventors: Dean C. Buck; Richard E. Warren, both of Loveland; David E. Smith, Fort Collins; David Rustici, Loveland, all of Colo.

[73] Assignee: Hewlett-Packard Company, Palo Alto, Calif.

[21] Appl. No.: 323,605

[22] Filed: Nov. 20, 1981

Related U.S. Application Data

[63] Continuation of Ser. No. 101,376, Dec. 7, 1979, abandoned.

[51] Int. Cl.³ .............................................. G01C 3/08
[52] U.S. Cl. .................................... 356/5; 343/9 R; 356/28.5
[58] Field of Search ...................... 343/9; 356/5, 28.5

[56] References Cited

U.S. PATENT DOCUMENTS

| | | | |
|---|---|---|---|
| 3,383,681 | 5/1968 | Bryant | 343/9 |
| 3,574,461 | 4/1971 | Yurasek | 356/5 |
| 3,900,259 | 8/1975 | Mott et al. | 356/5 |
| 4,190,361 | 2/1980 | Dubrunfaut | 356/5 |

Primary Examiner—S. C. Buczinski
Attorney, Agent, or Firm—Edward L. Miller

[57] ABSTRACT

An electronic distance meter is interfacable to a controller and measures distance to a moving target by comparing the phase of a signal propagated to the target with the phase of the reflected signal. A time mark indicating when the measurement was made is corrected by an offset to compensate for an apparent distance error related to the doppler effect. The corrected time mark indicates when the target was actually at the apparent distance. An asynchronously resettable timer provides measurement-to-measurement elapsed time information so that position-in-time and velocity data may be obtained. A multi-valued annunciator indicates the integrity of the target signal path.

27 Claims, 15 Drawing Figures

DATA FORMAT

ONE DATA WORD (TRANSFER OF MEASUREMENT AND PERTINENT INFORMATION) IS A 56 BIT WORD CONSISTING OF 14 BINARY CODED DECIMAL DIGITS (4 BITS EACH).

← 4 BIT BCD DIGIT

| OPERATING MODE | FUNCTION | DATA | | | | | | | | | ANNUNCIATORS | | | | |
|---|---|---|---|---|---|---|---|---|---|---|---|---|---|---|---|
| | | 13 | 12 | 11 | 10 | 9 | 8 | 7 | 6 | 5 | 4 | 3 | 2 | 1 | 0 |
| DISTANCE TRANSDUCER (REMOTE ONLY) | N/A | MSD ←――― TIME ―――→ LSD | | | | | MSD ←― DISTANCE OR SIGNAL STRENGTH (RAW COUNT) ―→ LSD | | | 1=SIGNAL STRENGTH 2=LOW FREQ 4=MED FREQ 8=HI FREQ | N/A | 0=BAL 1=NOT BALANCED 2=TGT B/B 4=REF B/B | N/A | N/A |
| | ON | N/A | ←――――― DISTANCE ―――――→ MSD LSD | | | | | | | N/A | 4 | 0=SOLID DISPLAY 1=FLASH DISPLAY | 0=FEET 1=METERS | 1=ACC 2=σ 3=TRACK |
| | PPM/SIG | 0=+ 9=− | ←― PPM ―→ MSD LSD | | | ←― FRACTION DIGITS ―→ MSD LSD | | | ←SIGNAL STRENGTH→ MSD LSD | | N/A | N/A | N/A | N/A | N/A |
| DISTANCE MEASURING INSTRUMENT (REMOTE & LOCAL) | 888 | N/A | 8 | 8 | 8 | 8 | 8 | 8 | 8 | 8 | N/A | N/A | 0=PASS 1=FAIL | N/A | 0 |
| | | | FAIL CODE OR; | | | | | | | | | | | | |

N/A = NOT APPLICABLE   MSD = MOST SIGNIFICANT DIGIT   LSD = LEAST SIGNIFICANT DIGIT
TGT B/B = TARGET BEAM BREAK   REF B/B = REFERENCE BEAM BREAK

FIG. 3

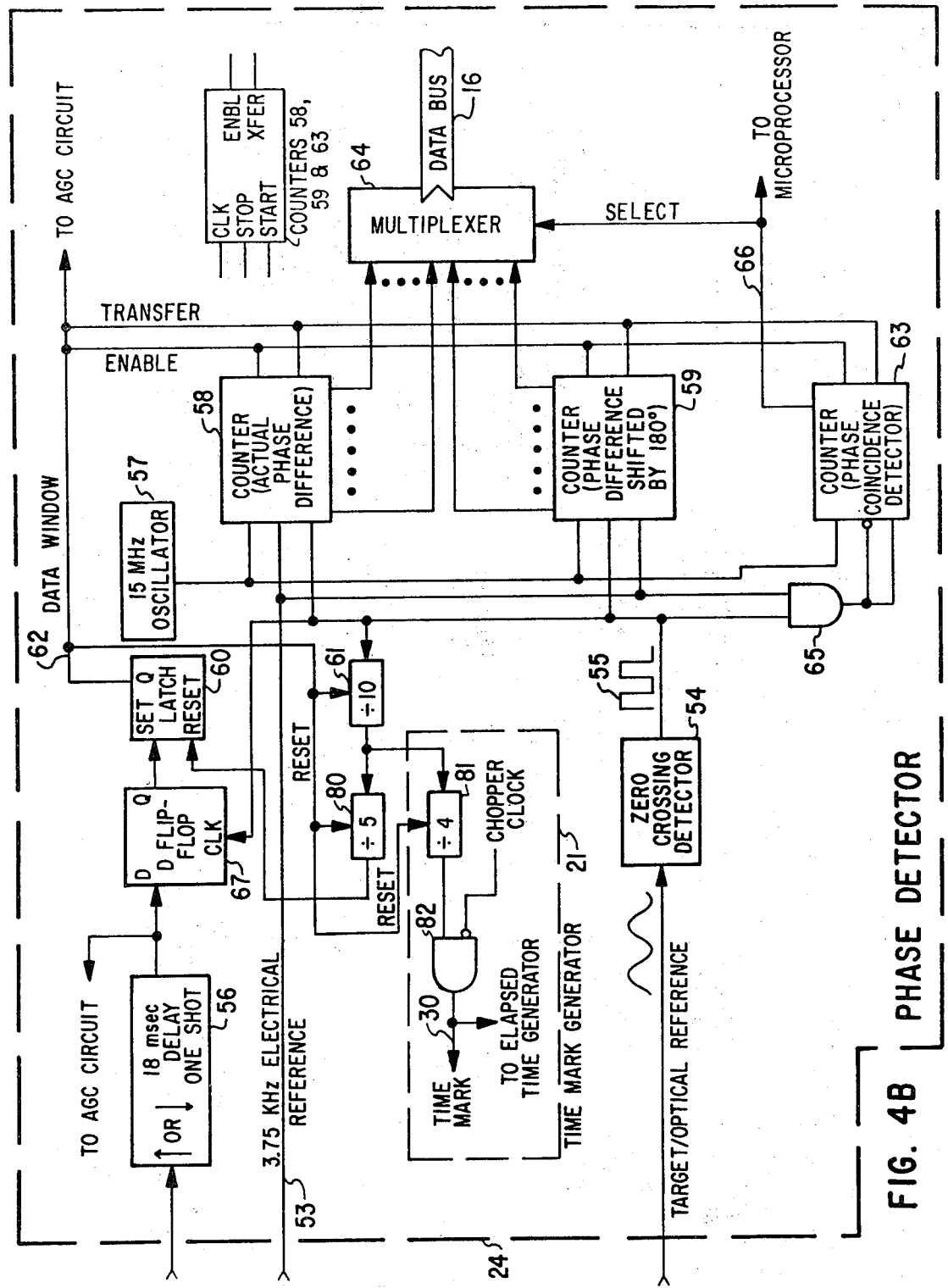
FIG. 4B  PHASE DETECTOR

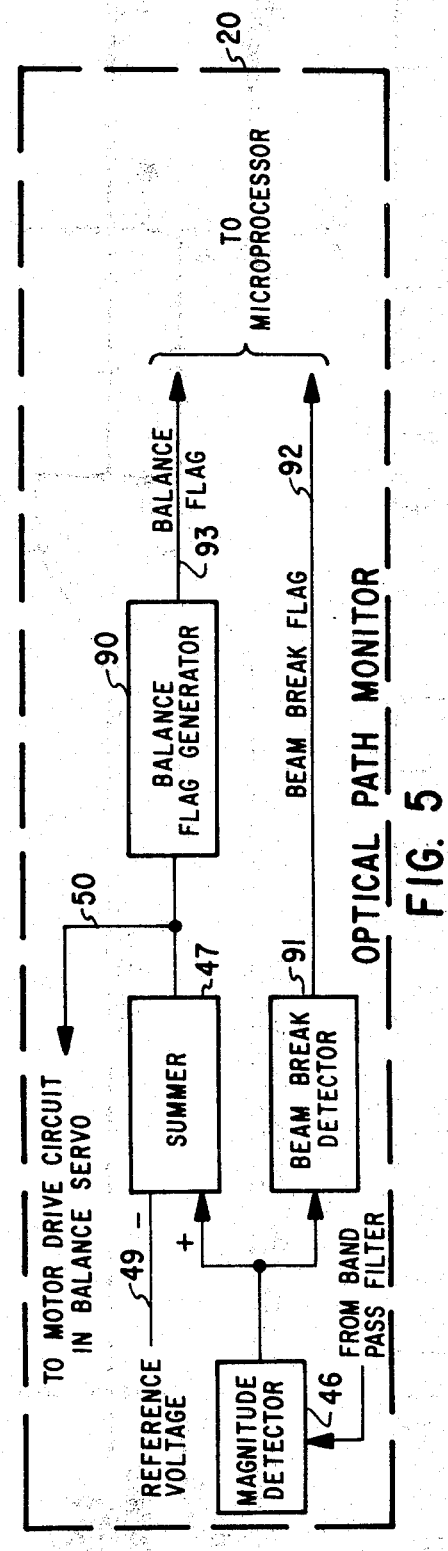

DISTANCE TRANSDUCER

This is a continuation of a copending application of the same title, Ser. No. 101,376, filed on Dec. 7, 1979, now abandoned.

BACKGROUND AND SUMMARY OF THE INVENTION

Previous electronic distance meters have been for use with stationary targets. Such distance meters provide information of the form "the distance to the target is so much." Since the target is stationary, the distance to the target does not change and it is not necessary to indicate when the target is (or was) at the indicated distance.

A distance meter that measures distances to moving targets must provide information of the form "at such and such a time the distance to the target was (or is) so much". Unambiguous distance information is provided by issuing a time mark signal when the target is at the indicated distance. Delays in the internal processing of the measurement must be accounted for in the timing of the time mark signal.

Ever present delays produced by filtering the position sensing signals give rise to two types of error. First, the phase delay, or apparent propagation delay, through the filter produces a time offset between when the target was at a given distance and when a phase measurement of the filtered signals indicates the given distance. Furthermore, the doppler effect causes the amount of the offset to be a function of target velocity. Second, in the presence of doppler shifts in frequency the filter produces differential phase shifts in the signals whose phases are to be compared. This produces an error in the indicated distance. If the error in the distance is converted to the time the target required to travel the amount of the error, and is then added to the apparent propagation delay, the resulting sum is a constant provided the velocity of the target does not exceed certain limits. By incorporating the offset into the timing of the time mark signal the distance meter provides accurate distance/time mark pairs.

A distance meter that responds to moving targets can also be used to determine target velocity if the time interval between measurements is supplied along with the distance information. The measured time intervals can be accumulated to form a time axis for the successive distance measurements. However, if the distance meter cannot promptly initiate a measurement in synchronism with an external event, there will be some offset between the accumulated time axis and the external event. While the offset can be measured and later removed, that is an awkward maneuver compared to removing the offset from the accumulated time axis in the first place, by providing an initial time interval whose time equals the duration between the external event and the next completed distance measurement. Such an initial time interval can be obtained by providing a means to asynchronously reset the internal time interval timer.

Distance meters that are suitable for measuring distances to moving targets may be relied upon to provide essential data in control systems. Damage to the system or injury to personnel may result if the distance meter should be unable to obtain valid measurements. To facilitate decision making by the control system, the distance meter provides coded information regarding the integrity of the target signal path and the apparent nature of the inability to obtain a measurement.

Accordingly, a primary object of the present invention is to provide a means of supplying a time mark signal that correctly corresponds with distance data obtained by a measurement to a moving target.

A second object of the invention is to provide means to coordinate time interval measurements for successive distance measurements with an initial external event.

Another object of the invention is to supply coded information relating to the integrity of the target signal path and the general nature of any inability to obtain a distance measurement.

BRIEF DESCRIPTION OF THE DRAWINGS

FIG. 3 depicts the format of data sent by the distance meter to the controller through the interface.

FIG. 4B is a more detailed block diagram of the phase detector and time mark generator portions of the block diagram of FIG. 2.

FIG. 5 is a more detailed block diagram of the optical path monitor portion of the block diagram of FIG. 2.

DESCRIPTION OF THE PREFERRED EMBODIMENT

Figure 1:
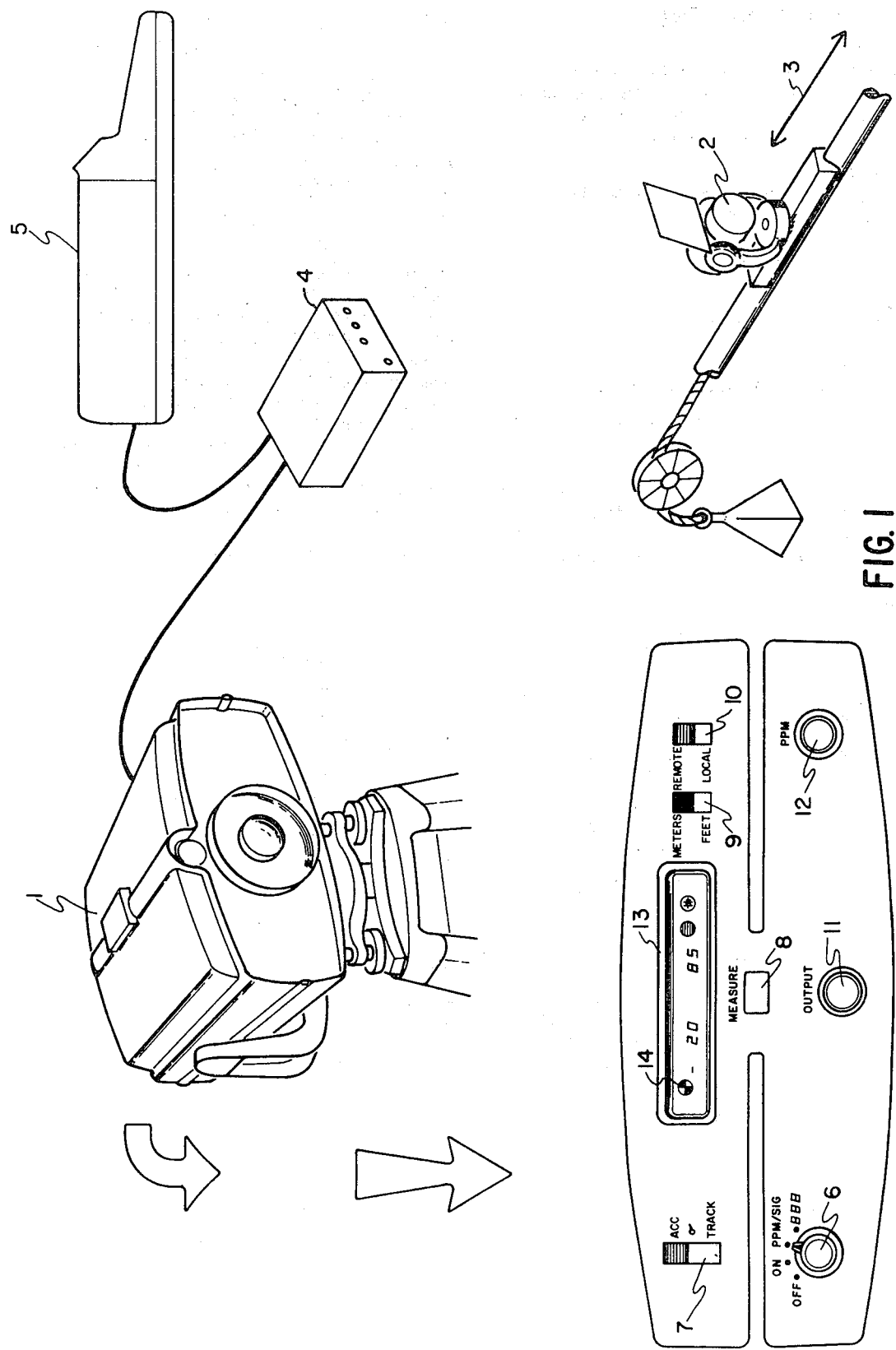
FIG. 1 is a pictorial view of a distance meter remotely controlled by a controller through an interface and aimed at a moving target.

Shown in FIG. 1 is a dynamic distance meter 1 capable of measuring changing distances to a target 2 moving along a path 3. The distance meter 1 can be operated locally from its front panel, or operated remotely. When operated remotely a controller 5, such as a programmable desktop computer or calculator, controls the distance meter 1 through an interface unit 4. The controller 5 can select various modes of distance meter operation as well as the range setting at which the distance is measured. The distance meter 1 supplies bit-serial time interval data and annunciator information to the interface unit 4, where it is converted to the format used by the controller 5.

Also shown in FIG. 1 is the front panel of the distance meter 1. Assuming the distance meter is being operated locally, a function switch 6 set in conjunction with a mode switch 7 allows the following types of distance meter operation.

When the function switch 6 is in the ON position, mode switch 7 provides three different modes of operation. First, when the mode switch 7 is in the position designated ACC, "accurate" distance measurement are displayed in a display 13. These are actual distances to the target, corrected for environmental conditions. The resolution for "accurate" measurements is one millimeter out of a maximum range of approximately 8 km. Second, when the mode switch 7 is in the position designated by small sigma the distance meter displays the standard deviation associated with the previous "accurate" measurement. This standard deviation value is calculated from a sequence of values averaged in finding that "accurate" measurement. Third, when the mode switch 7 is in the position designated TRACK the distance meter displays the distance to the target while rapidly updating the display 13 in accordance with changes in the least significant digits of that distance. In this mode the distance meter does not continually measure the most significant digits, but adjusts them in accordance with changes in the least significant digits.

When the function switch 6 is in the position designated PPM/SIG the display 13 contains information partitioned into two portions. One portion of the display will indicate the degree of environmental correction, in parts per million is determined by the setting of the knob 12 designated PPM. The other portion of the display will contain a scaled indication of the return strength of a propagated infrared measurement signal.

When the function switch 6 is in the position designated 888 the distance meter 1 performs an internal self-check.

With the exception of displaying the standard deviation, the activity associated with each of the previously described functions and modes is initiated by pressing a measure push button 8.

Switch 9 selects whether the distance measurement is displayed in meters or feet. Switch 10 selects whether the distance meter operates locally, as has been assumed, or remotely as is described below. The output push button 11 causes the information in the display 13, as well as various annunciators representing mode, range, and status information, to be logged by an external device. The use of the output feature allows selected logging of distance and annunciator data and may be initiated either remotely or locally. The push button 11 is active only during local operation and is disabled during remote operation. The output feature may, however, be activated electrically through the interface unit 4 during remote operation. The PPM knob 12 determines the amount by which the measured data is corrected for environmental factors.

Included in the display 13 is a data light 14. Once a measurement has been initiated the data light 14 is illuminated provided the strength of the signal reflected from the target is within an acceptable range. If the beam is interrupted or the return strength of the beam suddenly goes above or below acceptable limits the measurement is discontinued and the data light extinguishes. The measurement will be resumed provided this condition does not last longer than thirty seconds. If it does last longer than thirty seconds the measurement is aborted.

The difference between remote and local operation is as follows. In local operation all of the front panel controls operate as described above. In remote operation the current settings of the function switch 6, mode switch 7, and output push button 11 are ignored. Instead, function and mode information, as well as activation of the output feature, are determined by the controller 5 through the interface unit 4. The controller 5 issues command sequences recognized by the interface unit 4 which then latches the necessary control lines until a new mode or function is specified. The "measure function" of push button 8 can also be remotely actuated. During remote operation the "measure function" of push button 8 can also be actuated by pressing the push button itself, although this is not expected to be the normal precedure. The unit of distance measurement defaults to meters during remote operation, regardless of this setting of the switch 9. The PPM knob 12 continues to operate as described. The selection of remote or local operation is performed solely by the setting of the front panel switch 10.

The types of local and remote operation described above constitute operation of the distance meter in its capacity as a DMI (Distance Measuring Instrument). As a DMI the distance meter performs highly accurate measurements upon stationary targets. The distance data collected during a measurement is extensively processed before being presented to the user. Beam breaks and unfavorable environmental conditions can cause a single measurement to last as long as several minutes. Clearly this type of operation is not well suited for the measurement of distances to a moving target.

The distance meter 1 can also be operated in the capacity of a distance transducer. In its capacity as a distance transducer the distance meter provides accurate distance measurements between itself and a target moving as fast as 1,800 meters per second in one range and 45 meters per second in another range. When operating as a distance transducer the processing of data by an internal microprocessor is held to a minimum. The output information obtained while operating as a distance transducer is formatted in a manner to be described later, and includes distance, time, and signal strength data as well as various annunciators. Operation of the distance meter in the capacity of a distance transducer can only be performed remotely.

Figure 2:
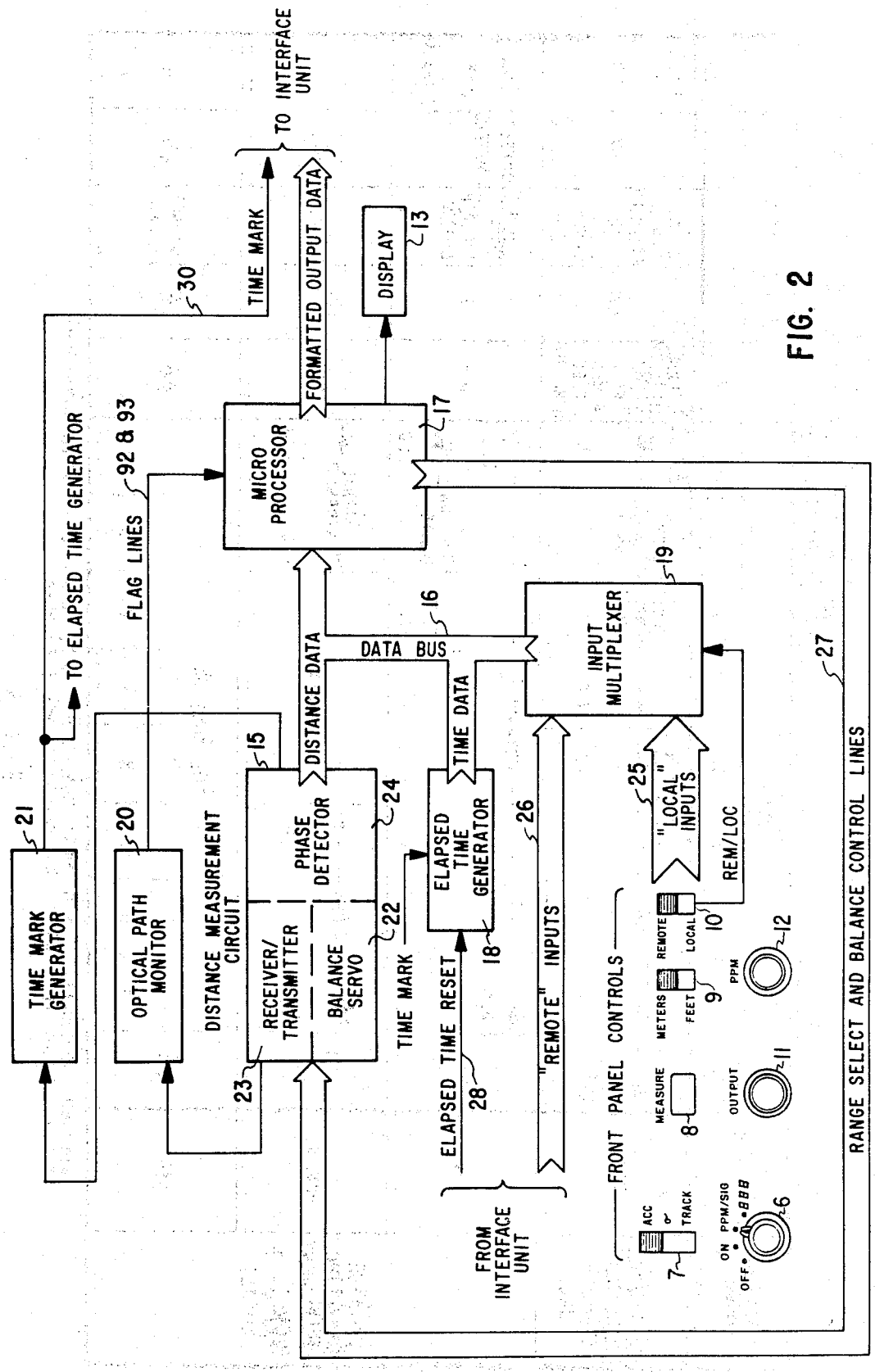
FIG. 2 is a simplified block diagram of the remotely controlled distance meter of FIG. 1, showing the general relationship of a time mark generator, an optical path monitor, and an elaped time generator with other portions of the distance meter.

FIG. 2 is a simplified block diagram of the distance meter 1. The distance meter 1 includes a distance measurement circuit 15 which itself includes a receiver/transmitter section 23, a balance servo section 22, and a phase detector section 24. A data bus 16 connects the distance measurement circuit 15 with a microprocessor 17. The distance measurement circuit 15 supplies the microprocessor 17 with distance data.

An input multiplexer 19 is also connected to the microprocessor 17 via the data bus 16. The input multiplexer 19 receives "local" inputs 25 from the front panel controls and receives via interface unit 4 "remote" inputs 26 selectively controlled by the controller 5. The input multiplexer 19 selects between "local" inputs 25 and "remote" inputs 26 according to the position of the remote/local switch 10.

Various range select and balance control lines 27 are managed by the microprocessor 17 in accordance with the selected function and mode and in response to the data obtained from the distance measurement circuit 15. The notion of balance control as well as the general principals of operation for the distance measurement circuit 15 are dsecribed in U.S. Pat. No. 3,619,058 and U.S. Pat. No. 4,113,381.

An optical path monitor 20 receives signal amplitude information from the receiver/transmitter portion 23 of the distance measurement circuit 15. The signal amplitude information represents signal conditions during repeatedly performed measurement pairs. Each measurement pair includes an external target distance measurement and an internal optical reference measurement. A new measurement pair is obtained each 111 ms. The optical path monitor 20 is reponsive to signal amplitude information to detect outright breaks in the optical path to or from the target, and to detect large variations in signal amplitude which may affect the quality of the data. Such large variations in signal amplitude can be caused by changes in the position of the target as well as by the presence of unfavorable environmental conditions.

A time mark generator 21 responsive to the phase detector 24 generates a signal 30 called TIME MARK. The leading edge of the signal 30 TIME MARK occurs when the moving target is actually at the distance which will subsequently be output fro the measurement currently being performed. The signal TIME MARK is also sent to an elapsed time generator 18 discussed below. The signal 30 TIME MARK has significance only while the distance meter is operating in the capacity of a distance transducer.

An elapsed time generator 18 measures the time between consecutive distance measurements signified by consecutive pulses of the signal TIME MARK 30. This time data is applied to the data bus 16. When the distance meter is being operated in the capacity of a distance transducer the microprocessor 17 obtains and outputs this time data to the controller 5 via the interface unit 4. The controller 5 can then determine the velocity of the target by dividing the difference in two consecutively measured distances by the time between the measurements. The elapsed time generator 18 may be arbitrarily reset by a signal ELAPSED TIME RESET 28. Such a reset occurring in coincidence with some external asynchronous event causes the generation of a fractional initial elapsed time indication. Following such a reset, a series of elapsed time measurements can be accumulated to provide a time axis originating with the asynchronous external event.

FIG. 3 illustrates the format of the serial data sent by the distance meter 1 to the interface unit 4. Each such transmission consists of fifty-six serially transmitted bits representing fourteen ordered BCD digits of four bits each. When the distance meter is operating in the DMI capacity the format is determined by the selected function. In the DMI capacity the transmitted information includes the information presented in the display, and also includes annunciator information representing the state of the various remote and local controls. The annunciator information is transmitted as BCD digits zero through four and the display information as BCD digits five through thirteen.

When the distance meter is operating in the capacity of a distance transducer BCD digits nine through thirteen represent time data from the elapsed time generator 18. BCD digits five through eight represent distance or signal strength information from the distance measurement circuit 15. BCD digit four signifies one of four modes within which the distance meter can operate as a distance transducer. The four modes are explained below and are determined by control lines among the "remote" inputs 26. BCD digit two represents the status of the optical path as determined by the optical path monitor 20. Four statuses are recognized. The significance of each of the four statuses is explained in connection with FIG. 5.

When BCD digit four is a one it indicates that the signal strength mode of distance transducer operation has been selected. In this mode BCD digits five through eight represent a scaled indication of the strength of the signal reflected from the target.

In the remaining three modes BCD digits five through eight represent distance information to a target that can be in motion. The maximum relative velocity between the distance meter and the target is a function of which of these remaining three modes is selected. When BCD digit four has a value of two the distance meter operates in a low frequency mode of modulation to the transmitted beam wherein distance measurements have a theoretical maximum range of 40 km. In practice, characteristics of the atmosphere combined with characteristics of the distance meter itself result in a limit of 8 km. When in the 40 km range BCD digits five through eight represent a collection of upper significance digits. These upper significance digits are a coarse representation of the measured distance. When BCD digit four has a value of four, the distance meter operates in a medium frequency mode of modulation of the transmitted beam, resulting in a distance measuring range having a modulus of 400 meters. In the 400 meters range BCD digits five through eight represent a collection of intermediate significance digits. When BCD digit four has a value of eight the distance meter operates in a high frequency mode of modulation to the transmitted beam, resulting in a distance measuring range having a modulus of ten meters. In the ten meter range BCD digits five through eight represent a collection of lower significance digits. These lower significance digits may be taken as a fine measurement for the distance being measured.

The controlling device 5 can, as required, arithmetically combine the upper, intermediate, and lower significance digits to produce complete distance information. The distance information so produced can possess varying numbers of significant digits and varying degrees of accuracy, depending upon the manner in which the data is combined. The various distance data can also be arithmetically combined with the elapsed time information to provide target velocity information.

In the low frequency mode of operation the theoretical maximum velocity of the target relative to the distance meter is approximately 400,000 miles per hour, well beyond the practical capabilities of the present system. However, in the medium frequency mode of operation the maximum velocity of the target relative to the distance meter is 1,800 meters per second. At this velocity it is possible to perform several measurements before the target moves beyond the absolute range of the distance meter. In the high frequency mode of operation the maximum relative velocity between the distance meter and the target is forty-five meters per second. These velocity limits are obtained by dividing half the distance range by the ninth of a second (111 ms) between consecutive distance measurements. Restricting the distance range to half its value ensures that differing distance measurements having a certain modulus may be correlated with one another.

Figure 4A:
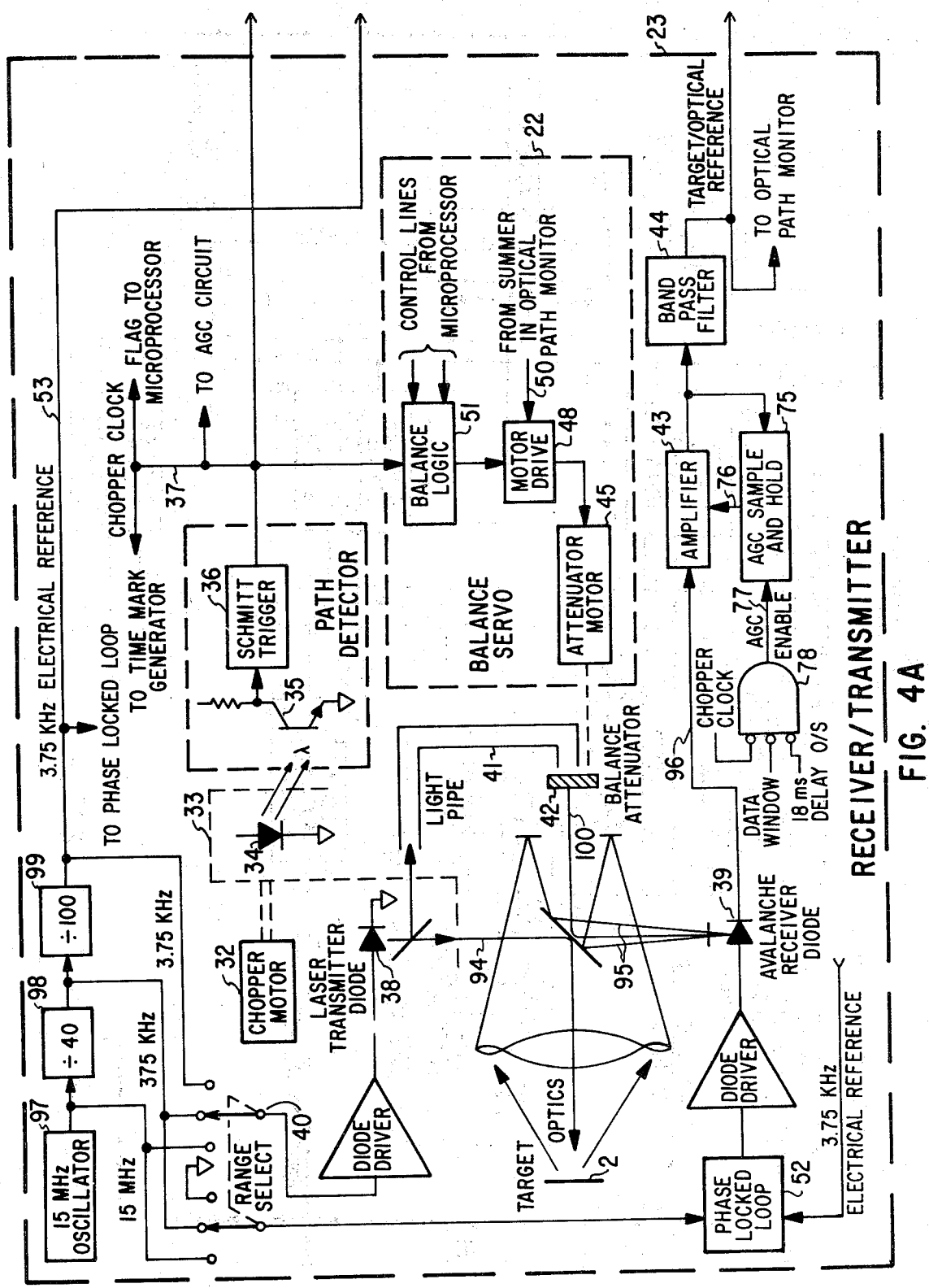
FIG. 4A is a more detailed block diagram of the receiver/transmitter and balance servo portions of the block diagram of FIG. 2.

FIGS. 4A and 4B show in greater detail the distance measurement circuit 15 of FIG. 2. Distance measurement circuit 15 includes a receiver/transmitter section 23, a balance servo section 22, and a phase detector section 24. The receiver/transmitter 23 can modulate a beam of light with one of three different frequencies, each one of which produces a corresponding modulus, or range, of distance measurement. These frequencies are produced by an oscillator 97 in conjunction with the dividers 98 and 99 and a range select circuit 40. The oscillator 97 is shown as having an ideal frequency of exactly 15 MHz, and the outputs of the dividers 98 and 99 as having ideal frequencies of 375 KHz and 3.75 KHz, respectively. Those values have been chosen to facilitate the explanation of a preferred embodiment wherein it is assumed that the speed of light through the various intervening media is always exactly $3 \times 10^8$ meters per second. That gives rise to distance measuring ranges of exactly forty kilometers, four hundred meters and ten meters. The phase detector 24 is so constituted that once those ranges are established a digital count produced in the phase detector 24 has units of meters or millimeters without further conversion. In an actual system operating in the earth's atmosphere the speed of light is somewhat less than $3 \times 10^8$ meters per second, and the frequency of the oscillator 97 is slightly less than the ideal 15 MHz.

The function of the receiver/transmitter section 23 is to transmit a modulated beam of infrared light to the target 2. The returning signal is heterodyned to a lower frequency (except when in the low frequency 40 km range), amplified and filtered.

Referring now to FIG. 4A, a chopper motor rotates a chopper wheel 33. Chopper wheel 33 optically selects alternately between received modulated light reflected from the target and a similarly modulated internal reference. Distance measurements are performed by comparing the phase of the received signal with that of the internal reference signal. These two aspects of receiver/transmitter operation may be referred to as "reference-time" and "target-time". These two times are of equal duration and each occurs alternately at a 9 Hz rate. Other portions of the distance meter must know when reference-time is occurring and when target-time is occurring. To generate a signal CHOPPER CLOCK 37 that represents these alternating times a light emitting diode 34 is optically coupled through the chopper wheel 33 to a photo transistor 35. The photo transistor 35 drives a Schmitt trigger 36 whose output is the desired signal CHOPPER CLOCK 37.

During target-time intensity modulated infrared light 94 from a laser transmitter diode 38 is sent to and reflected from the target 2. The returning light 95 is focused onto an avalanche receive diode 39. The infrared light 94 transmitted to the target 2 from laser transmitter diode 38 is modulated with one of three frequencies provided by a range select circuit 40.

During reference-time the optical path from laser transmitter diode 38 to the target 2 is blocked by the chopper wheel 33. At the same time a previously blocked path from laser transmitter diode 38 to a light pipe 41 is unblocked. The intensity modulated light from laser transmitter diode 38 is fed through the light pipe 41 to a variable density balance attenuator 42 driven by an attenuator motor 45. The attenuator motor 45 is responsive to the balance servo circuit 22 to be described later. The light 100 passing through the balance attenuator 42 is focused onto the avalanche receiver diode 39. The light 100 reaching the avalanche receiver diode 39 during reference-time is intensity modulated with the same signal which modulated the beam of light sent to the target. Thus, the avalanche receiver diode 39 alternately receives signals of intensity modulated light whose respective phases represent the phase sent to target and the phase received from the target.

Avalanche receiver diode 39 operates as a mixer whose output will nominally contain an ideal 3.75 KHz component. This follows from the non-linear characteristics of the diode in conjunction with its being driven by a local oscillator signal provided by a phase locked loop 52 responsive to the range select circuit 40. U.S. Pat. No. 4,113,318 contains additional information about the heterodyning function of avalanche receiver diode 39. The alternating 3.75 KHz target-time and reference-time signal components are amplified by amplifier 43 and filtered by a band pass filter 44. The output of the band pass filter 44 is a sine wave whose phase varies between reference-time and target-time, according to the distance to the target 2. Since reference-time and target-time occur in alternation the phase difference between them cannot be determined directly. Measured instead are the phase differences between a 3.75 KHz signal ELECTRICAL REFERENCE 53 and each of the alternating target and optical reference signals. These intermediate phase differences are combined by the microprocessor 17 to obtain the desired phase difference.

The strength of the light reaching the avalanche receiver diode 39 during target-time is strongly dependent upon the distance to the target 2. This directly affects the amplitude of the signals sent to the amplifier 43. During reference-time, however, distance to the target does not affect the intensity of the light reaching the avalanche receiver diode 39. Left unaccounted, for, this would result in potentially wide variations in signal strength suddenly reaching the amplifier 43. It is highly desirable to operate the amplifier 43 at a fixed gain throughout pairs of associated target- and reference-times. To achieve this, the gain of the amplifier 43 is set during a concluding portion of target-time and held constant throughout the subsequent reference-time and the initial part of the next target-time. During each reference-time the balance servo 22 adjusts the balance setting of the balance attenuator 42 to reduce the intensity of light travelling along the internal reference path until it approximates that received from the target.

The gain of the amplifier 43 is set as follows. An AGC sample and hold circuit 75 responds to a signal AGC ENABLE 77 and the output of the amplifier 43 to produce an AGC signal 76 that determines the gain of the amplifier 43. During the period of time that the signal AGC ENABLE 77 is true the AGC sample and hold circuit 75 adjusts the AGC signal 76 to produce from the amplifier an output signal having a predetermined optimum value. When AGC ENABLE goes false the current value of the AGC signal 76 is held until AGC ENABLE is again true. AGC ENABLE is true for 24.5 ms starting 31 ms after the onset of target-time. An AND gate 78 produces the logical exclusion of reference-time (demand $\overline{\text{CHOPPER CLOCK}}$), a signal representing a recurring interval when phase comparisons are made (demand $\overline{\text{DATA WINDOW}}$) and a signal by which the onset of DATA WINDOW is delayed after the onset of target-time (demand 18 ms DELAY O/S be false). The generation of DATA WINDOW and the 18 ms delay are both explained in connection with FIG. 4B. All of these signals are shown in relation to one another in FIG. 12. A brief reference to FIG. 12 will show that the effect of AND gate 78 is to produce AGC ENABLE 77 during the last 24.5 ms of target-time; that is, for the remaining portion of target-time following the phase comparison.

Referring now to FIG. 5 and 4A, the balance servo 22 operates as follows. The output of the band pass filter 44 is coupled to a magnitude detector 46. The magnitude detector 46 produces a DC voltage whose magnitude is proportional to the peak-to-peak value of the output of the band pass filter 44. A summer circuit 47 combines the DC voltage from the magnitude detector 46 with a reference voltage 49, and has an output 50 coupled to a motor drive circuit 48. The motor drive circuit 48 is selectively enabled by a balance logic circuit 51, and when enabled drives the attenuator motor 45.

Referring now to FIG. 4B, a zero crossing detector 54 converts the sine wave output of the band pass filter 44 into a square wave signal 55. The square wave signal 55 is nominally the ideal 3.75 KHz; during reference-time it will be exactly that, but during target-time it is subject to doppler shift when the target is moving.

An 18 ms delay one shot 56 is triggered by each transition in the signal CHOPPER CLOCK 37. The 18 ms delay provided by delay one shot 56 allows the system to settle after the transition from target-time to reference-time, or from reference-time to target-time. The output of the delay one shot 56 sets a D flip-flop 67 upon the next rising edge of the square wave signal 55. Setting flip-flop 67 sets a latch 60, whose Q output in turn causes the onset of a signal called DATA WINDOW 62. A divide-by-five circuit 80 is driven by a divide-by-ten circuit 61 which is in turn driven by the square wave signal 55. After fifty cycles of the square wave signal 55 an output produced by the divide-by-five circuit 80 resets the latch 60, producing the trailing edge of the signal DATA WINDOW 62. Meanwhile, the output of the delay one shot 56 has previously returned to its quiescent state, allowing the D flip-flop 67 to be reset by a subsequent cycle of the square wave signal 55.

The significance of the signal DATA WINDOW 62 is that it represents the time during which phase comparisons are performed. The phase detector 24 alternately performs phase comparisons between the electrical reference signal 53 of 3.75 KHz and the target and reference portions of the signal from the band pass filter 44. During target-time the comparison is between the signal ELECTRICAL REFERENCE 53 and the target portion of the output of the band pass filter 44. During reference-time the comparison is between the signal ELECTRICAL REFERENCE 53 and the reference portion of the output of the band pass filter 44. The difference between the two phase comparisons represents the distance to the target 2.

For the duration of the signal DATA WINDOW 62 counters 58 and 59 accumulate pulses from a 15 MHz oscillator 57. The duration of DATA WINDOW is fifty cycles of the signals whose phases are to be compared. During those fifty cycles the counters 58 and 59 accumulate pulses from the oscillator 57, resulting in counts that represent a phase difference based on the average for the fifty cycles. The leading edges of the signals whose phase comparison is desired are used to start and stop the counters. What starts counter 58 stops counter 59. What stops counter 58 starts counter 59. Thus, the phase difference accumulated by counters 58 and 59 are offset from one another by a phase difference of 180 degrees.

A phase coincidence detector counter 63 determines which accumulated phase measurement from among counters 58 and 59 is to be sent by a multiplexer 64 to the data bus 16 and thence to the microprocessor 17. The operation of the phase coincidence detector counter 63 is as follows. The start and stop signals that control counters 58 and 59 are combined by an AND gate 65 to produce a signal whose duty cycle is related to the degree of phase separation between the start and stop signals. The start and stop control signals for counter 58 and 59 are symmetrical. Assume that they are in phase, that is, that the condition of phase coincidence has occurred. Under these conditions the output of AND gate 65 will be a symmetrical square wave, and the counter 63 will count clock pulses from the 15 MHz oscillator 67 for fifty percent of the time. This is the maximum amount that it will ever count. If, on the other hand, the start and stop signals for counters 58 and 59 are exactly out of phase there is never any output from AND gate 65, and counter 63 does not count at all. Thus, the count in counter 63 can range from a minimum limit of zero to a maximum limit of half of the maximum count possible in either counters 58 or 59. In operation, the count in counter 63 varies linearly between these minimum and maximum limits according to the phase difference between the start and stop signals controlling counters 58 and 59.

Phase coincidence detector counter 63 is a BCD counter. Output line 66 represents the least significant bit of the fifth BCD digit of counter 63. Output line 66 is a zero whenever the count in counter 63 is less than or equal to half its maximum limit, and is a one whenever the count is greater than half the maximum limit. Line 66 is coupled to the multiplexer 64 for selecting which of counters 58 and 59 has its count sent to the microprocessor 17. Output line 66 itself is also sent to the microprocessor 17 so that data sent to the micrprocessor 17 may be identified and, if necessary, arithmetically adjusted for the 180° phase difference between counters 58 and 59.

FIG. 5 shows the optical path monitor 20 in greater detail. A magnitude detector 46 produces a DC voltage proportional to the peak-to-peak amplitude of the output of the band pass filter 44. The DC voltage is supplied to both a beam break detector 91 and a summer 47. The beam break detector 91 generates a signal BEAM BREAK FLAG 92 which is coupled to the microprocessor 17. The summer 47 combines the DC voltage from the magnitude detector 46 with a reference voltage 49 to produce a signal 50 coupled to both the balance servo 22 and a balance flag generator 90. The balance flag generator 90 generates a signal BALANCE FLAG 92 which is coupled to the microprocessor 17.

The operation of the optical path monitor 20 is as follows. The beam break detector 91 compares the signal level of the output of the band pass filter 44 against upper and lower limits representing the range of acceptable return signal strength. Recall that the AGC sample and hold circuit 75, described in connection with FIG. 4A, sets the gain of the amplifier 43 during a concluding portion of target-time. This establishes a nominal output level from the amplifier 43, and hence from the band pass filter 44. The upper limit established by the beam break detector 91 is three and one half times the nominal level. The lower limit is one fourth the nominal level. The signal BEAM BREAK FLAG 92 is set by the beam break detector 91 to a voltage representing a logic one whenever the output of the band pass filter 44 is within the upper and lower limits, and is set to a voltage representing a logic zero whenever the output exceeds the limits. A phase measurement made while the signal BEAM BREAK FLAG 92 is a logic zero is not valid.

The balance flag generator 90 generates a signal BALANCE FLAG 93 that indicates if the output of the filter 44 is within plus or minus ten percent of its nominal value. If the ten percent range is exceeded, the microprocessor 17 during reference-time activates the balance logic 51, which then responds to the signal 50 from the summer 47. The attenuator motor 45 then rotates the variable density balance attenuator 42 until a balanced condition is obtained.

From the signals BEAM BREAK FLAG 92, BALANCE FLAG 93, and CHOPPER CLOCK 37 the microprocessor 17 is able to determine the value of annunciator digit two for distance transducer operation, as shown in FIG. 3. The following table shows the rule for generating the value of annunciator digit two.

| VALUE OF DIGIT TWO | BALANCE FLAG | BEAM BREAK FLAG | CHOPPER CLOCK |
|---|---|---|---|
| 0 | balanced | within limits | don't care |
| 1 | unbalanced | within limits | don't care |
| 2 | don't care | outside limits | target-time |
| 4 | don't care | outside limits | reference-time |

The significance of BCD digit two having a value of zero is that the distance meter is operating normally, and that the target signal path has high integrity.

The significance of BCD digit two having a value of one is that the distance meter is operating near its marginal limits because of some non-fatal anomaly in the target path. Such an anomaly could be caused by dirty optics, a dirty target, unfavorable atmospheric conditions, or sudden moderate changes in the return strength of the reflected target signal.

The significance of BCD digit two having a value of two is that the distance meter cannot operate properly because of an actual interruption in the target path or because of a sudden extreme change in the return strength of the reflected target signal.

The significance of BCD digit two having a sustained value of four may be that the distance meter cannot operate properly unless an external attenuator cap is placed over the transmitter optics. That becomes necessary whenever the return signal strength is so strong that the internal balance attenuator is unable to increase the signal strength of the reference path to match that of the target signal. Or, it may mean that the return signal is too weak. Lastly, it may means that the balance circuit has not had time to achieve a balanced condition. Brief values of four are like values of two.

FIGS. 6 through 10 comprise an analysis of how the location of the signal TIME MARK 30 is chosen. When the distance meter 1 measures the distance to a moving target 2 several factors must be taken into account before there can be obtained accurate data of the form "it was then that the target was there". The motion of the target introduces errors in both the perceived "then" and "there". These errors are significant at even modest target velocities, and should be dealt with if the accuracy specification of the instrument for moving targets is to be commensurate with that for stationary targets.

Casual inspection does not at first suggest that any particular correction technique is superior to another. One could, for instance, adjust the erroneously measured distance to agree with some conveniently generated time mark. Or, the distance and the time mark could both be adjusted simultaneously. If, however, the error in the perceived distance is let stand, and is considered instead as an additional time value by which the time mark must be adjusted in addition to its own naturally occurring error, then the sum of those two values is constant. This is true regardless of the velocity of the target and regardless of whether the target is moving closer to or further from the distance meter. FIGS. 6–10 and their associated descriptions explain this interesting result.

Figure 6:
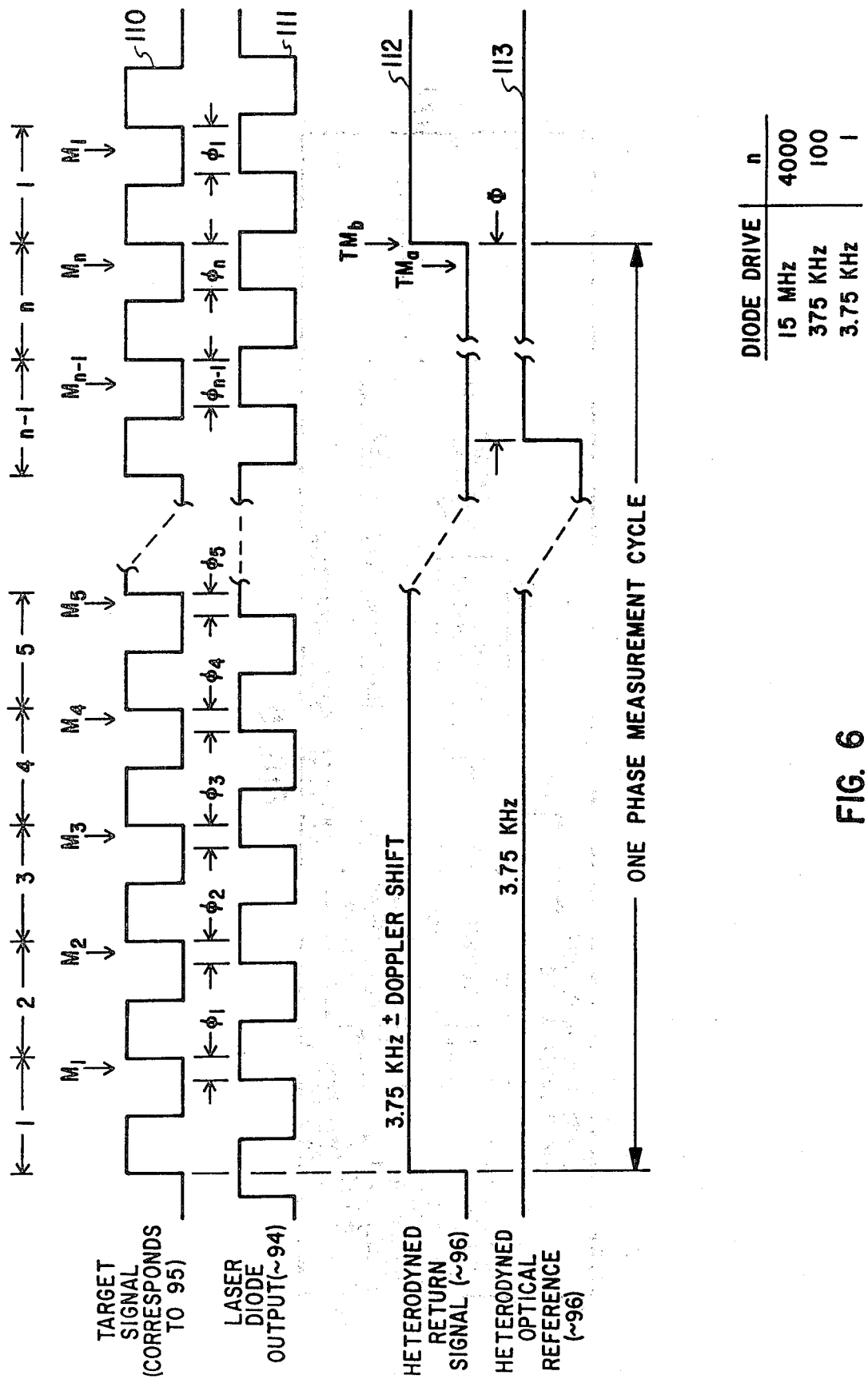
FIG. 6 is a waveform diagram depicting the phase relationship of the measuring signals before and after a heterodyning process, and shows the locations of various times of interest.

FIG. 6 depicts the correspondence of a pair of infrared light signals 110 and 111 with a pair of electrical signals 112 and 113. The signal 111 represents the intensity modulated infrared light sent to the target. It corresponds to reference numeral 94 of FIG. 4A. In practice, this signal will be either the ideal fine measurement frequency of 15 MHz or the ideal intermediate frequency of 375 KHz. The ideal coarse measurement frequency of 3.75 KHz is not precluded by the technique to be described, but is generally impractical for other reasons related to the degree of resolution and the maximum range of the instrument when operated in the low frequency range. The signal 110 represents the returning infrared light reflected from a target moving with a constant velocity. In the present example the target is receding from the distance meter and the values of the various $\phi_i$ through $\phi_n$ comprise a monotonically increasing sequence. This follows from the doppler effect produced in the return signal by the moving target. It also follows that the frequency of the signal 110 is somewhat less than that of the signal 111, although that cannot be discerned in drawings that are conveniently scaled, as in FIG. 6.

Assuming that the distance to the target 2 is less than the modulus of the measurement range, consider individual measurements of the various $\phi_i$. Let this be done by measuring the time between corresponding rising edges of the signals 111 and 110. Such measurements could not normally be instantaneous ones; each would require the time duration between the edges. During that time the target is moving and the light propagates along a round trip path to the target. As the measurement of each individual $\phi_i$ is completed, when was the target at the distance corresponding to the measured $\phi_i$? At the instant some feature of propagated wave 111 hits the target and is reflected, the target may be considered to be standing still, and thus the length of the propagation path out equals the length of the propagation path back. The corresponding distance clearly occurs at the midpoint of the time interval required to measure $\phi_i$. These various midpoints are represented by $M_1$ through $M_n$.

The actual phase comparison is not performed between signals 110 and 111. Instead, those signals are each heterodyned by the receiver diode 39 to respectively produce signals 112 and 113. The heterodyned optical reference signal 113 corresponds to that portion of the signal 96 (refer to FIG. 4A) entering the amplifier 43 during reference-time, and is derived from the infrared signal from the light pipe 41. The heterodyned return signal 112 corresponds to that portion of signal 96 entering the amplifier 43 during target-time, and is derived from the reflection from the target 2. Recall that target-time and reference-time are mutually exclusive, and that their phase difference is actually found by comparing each in turn with the signal ELECTRICAL REFERENCE 53, and subsequently combining the results. Depicting waveforms 112 and 113 as simultaneous signals with a common time axis is equivalent to what is actually done, and facilitates the explanation.

The optical reference signal 113 is ideally 3.75 KHz, regardless of the frequency selected for the laser diode output signal 111. This occurs because the range select circuit 40, in conjunction with dividers 98 and 99, supply the phase locked loop 52 with both the frequency of the laser diode drive signal 111 and the 3.75 KHz signal ELECTRICAL REFERENCE. Except when the laser diode drive frequency f is already 3.75 KHz, the phase locked loop 52 produces the offset frequency f−3.75 KHz. (In the 40 Km range the phase locked loop 52 produces the offset frequency f+0.) It is this offset frequency that is mixed with the alternating infrared signals 95 and 100 to produce signals 112 and 113 respectively. Mixing f−3.75 KHz with f produces a 3.75 KHz component that can later be extracted by a 3.75 KHz filter. The band pass filter 44 is such a filter. Signals 112 and 113 represent the unfiltered 3.75 KHz components, however.

As shown in FIG. 6 the rising edge of the signal 112 occurs simultaneously with the rising edge of the nth cycle of the signal 110. While that is a possibility, it does not represent the general case. The rising edge of the signal 112 can occur anywhere within the nth cycle of the signal 110, according to the phase of the output of the phase locked loop 52. If the two rising edges were not to line up, all it would mean is that $\phi_n$ is being considered from some point on the signal 111 that is not the rising edge to the corresponding point on the signal 110. The midpoint $M_n$ would move accordingly and would be simultaneous with $TM_a$, yielding the same result as in the case depicted.

Whereas the heterodyned optical reference signal 113 is always the ideal 3.75 KHz, the frequency of the heterodyned return signal 112 will be the ideal 3.75 KHz plus or minus some quantity produced by the doppler effect. The maximum tolerable doppler shift present in the heterodyned return signal 112 will be ±5 Hz.

It can be shown by application of the theory of mixers that the instantaneous phase difference between signals 112 and 113 continuously equals the linearly varing instantaneous phase difference between signals 110 and 111. Consequently, the time-measured phase difference $\phi_n$ corresponds to the time-measured phase difference $\Phi$. Also, when the phase difference $\Phi$ is ultimately obtained it represents the distance to the target at time $M_n$. That same distance existed at the time represented by time mark $TM_a$.

Time marks $TM_a$ through $TM_e$ are developed throughout the analysis of FIGS. 6 through 10. Each such time mark represents a succeeding approximation of the correct location for the signal TIME MARK 30 as the signals possessing phase information are processed by successive circuit elements. Some of the time marks preceeding $TM_e$ are hypothetical constructs that would be impractical to actually implement. Nonetheless, they are still concepts useful in the analysis.

It would not be easy to generate a time mark signal having a transition at time $TM_a$. To do so would require anticipating the rising edge of the signal 112. Instead, the rising edge of signal 112 can be taken as the time mark $TM_b$ with a maximum error not much more than the resolution of the distance meter. For example, when the highest resolution measurements are being made in the ten meter range the ratio between signal 110 and signal 112 is four thousand to one. Under these conditions the frequency of signal 110 is the ideal 15 MHz, which has a period of 66.667 nsec. One-half of that amount, or 33.33 nsec, is the maximum possible error by which $TM_b$ can be delayed after $TM_a$ if the distance to the target is less than ten meters. That is a very small time in comparison with the nominal 111 msec between successive distance measurements, and corresponds to a distance of $1.5 \times 10^{-6}$ meters at the maximum target velocity of forty-five meters per second. That is well below the one millimeter resolution of the distance meter. If the distance to the target exceeds ten meters then an extra 66.667 nsec of error is induced for each ten meter interval contained in the distance to the target. Even supposing that the user is accumulating incremental changes measured in the ten meter range while the distance is 8 km, the worst possible cumulative error is only 2.4 mm at a target velocity of forty-five meters per second. Finally, even at 8 km, absolute error between two consecutive measurements would be less than $1.5 \times 10^{-6}$ meters, which allows very precise measurement of incremental changes.

A time mark at $TM_b$, then, closely approximates the proper location of an ideal time mark for a single phase measurement. However, this is true only as long as there is no averaging of consecutive phase measurements and no filtering of the signals whose phase differences are being measured. For noise suppression it is desirable to average consecutive phase measurements, and in order to separate the 3.75 KHz component from others present in the mixer output it is necessary to use a filter. The respective effects of these two operations will now be considered.

Figure 7:
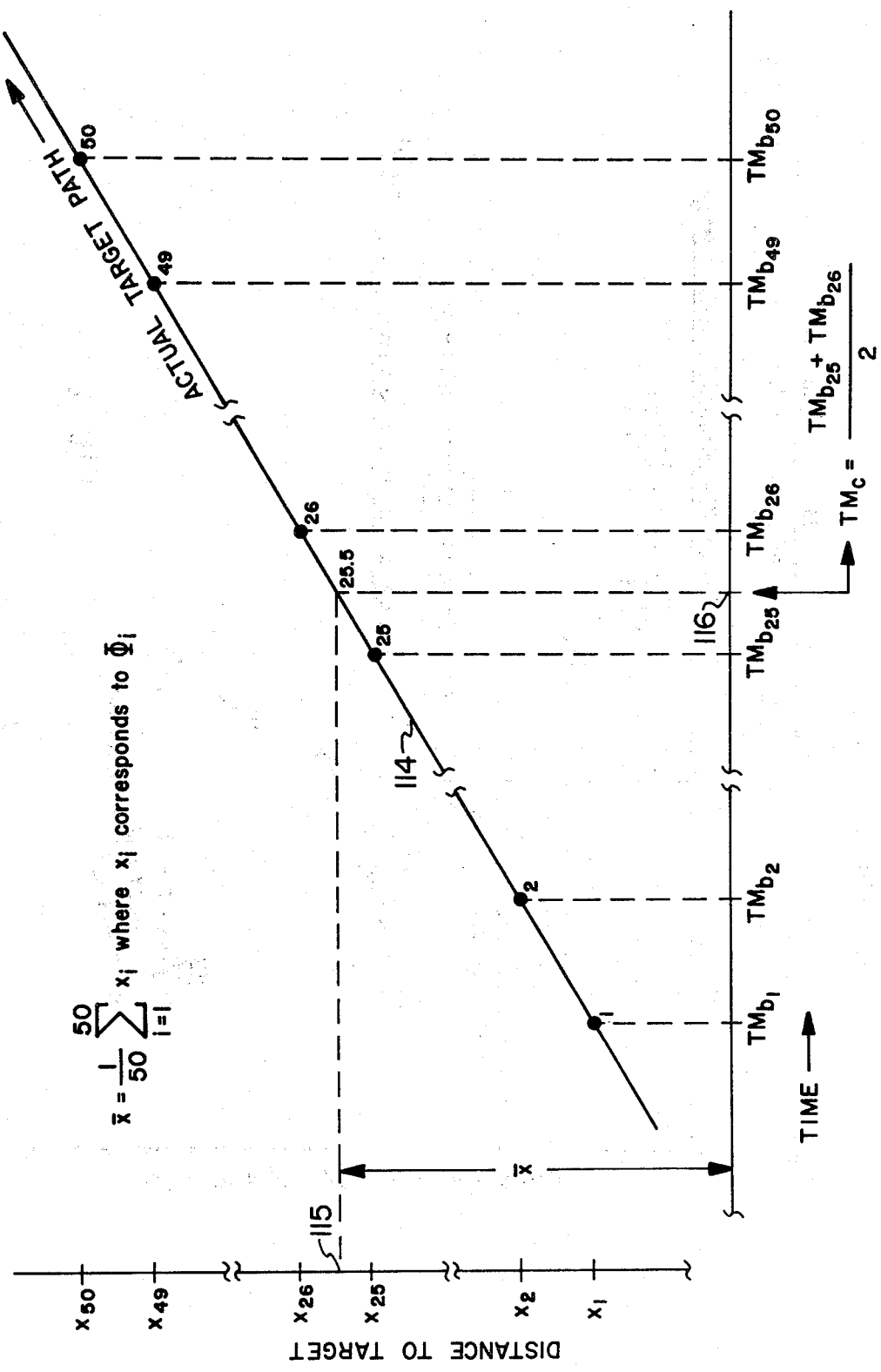
FIG. 7 is a graph of actual distance versus time for a moving target, and shows that the average distance over fifty phase comparisons is, and at what time it occurs, assuming no filtering of the measurement signals.

FIG. 7 shows a graph 114 of actual target position versus time. The graph incorporates the negligible error of taking $TM_b$ for $TM_a$. The distance meter averages fifty consecutive $\Phi_i$ of FIG. 6. Let the distance to the target at time $TM_{bi}$ be $x_i$. There are fifty such times and fifty such distances. Since the velocity of the target is constant, and since the fifty consecutive phase measurements are of equal duration, the fifty $X_i$ are equally spaced from one another by some constant distance $\Delta$. The average distance to the target is one fiftieth of the sum of the fifty $X_i$ and equals the midpoint of the distance interval between $X_{25}$ and $X_{26}$. That is:

$$x_{i+1} - x_i = \Delta, \text{ and}$$

$$\bar{x} = \frac{1}{50} \sum_{i=1}^{50} x_i$$

$$= \frac{1}{50}(x_1 + x_1 + \Delta + x_1 + 2\Delta + \ldots + x_1 + 49\Delta)$$

$$= \frac{1}{50}\left(50x_1 + \Delta \sum_{k=1}^{49} k\right)$$

$$= x_1 + \frac{\Delta}{50} \cdot \frac{(49)(50)}{2}$$

$$= x_1 + 24.5\Delta$$

$$= x_{25} + \frac{\Delta}{2}$$

$$= \frac{2x_{25}}{2} + \frac{x_{26} - x_{25}}{2}$$

$$= \frac{x_{25} + x_{26}}{2}$$

The location of $\overline{X}$ along the distance axis of the graph 114 of FIG. 7 is indicated by reference numeral 115. Because the velocity of the target is constant it is clear that the time 116 when the target was at the distance $\overline{X}$ is midway between $TM_{b25}$ and $TM_{b26}$. Let that time be called $TM_c$. Thus $TM_c$ and $\overline{X}$ form a time-distance pair which accurately describes the target's position in time. This point will be used as the reference from which errors in the perceived "then" and "there" shall subsequently be measured.

A method for generating a signal for $TM_c$ is suggested by noting that a rising edge of the heterodyned return signal 112 occurs at each $TM_b$, and that the signal 112 is symmetrical if the velocity of the target is constant. Thus, a falling edge of the heterodyned return signal 112 occurs midway between each $TM_b$. A signal for $TM_c$ could be generated by counting twenty-five complete cycles of the heterodyned return signal 112 and then generating the $TM_c$ signal on the next falling edge of the signal 112. This method has the advantage that it correctly reflects changes in the length of time needed to measure the individual $\Phi$, as the frequency of the heterodyned return signal 112 changes with differing target velocities.

However, as described above $TM_c$ is related to the unfiltered heterodyned waveforms 112 and 113. As mentioned earlier, it is necessary to filter the output of the mixer to extract the desired components. Filtering will introduce an amount of phase delay that varies as a function of the velocity of the target. The variations in phase delay produce two distinguishable error effects, each of which must be taken into account. However, the depicted relationship of FIG. 7 can be applied to signals from the filter, provided the error effects introduced by the filter are subsequently taken into account, as explained below. Let $TM_d$ designate the time mark obtained by applying the procedure of FIG. 7 to the filtered signals.

Figure 8:
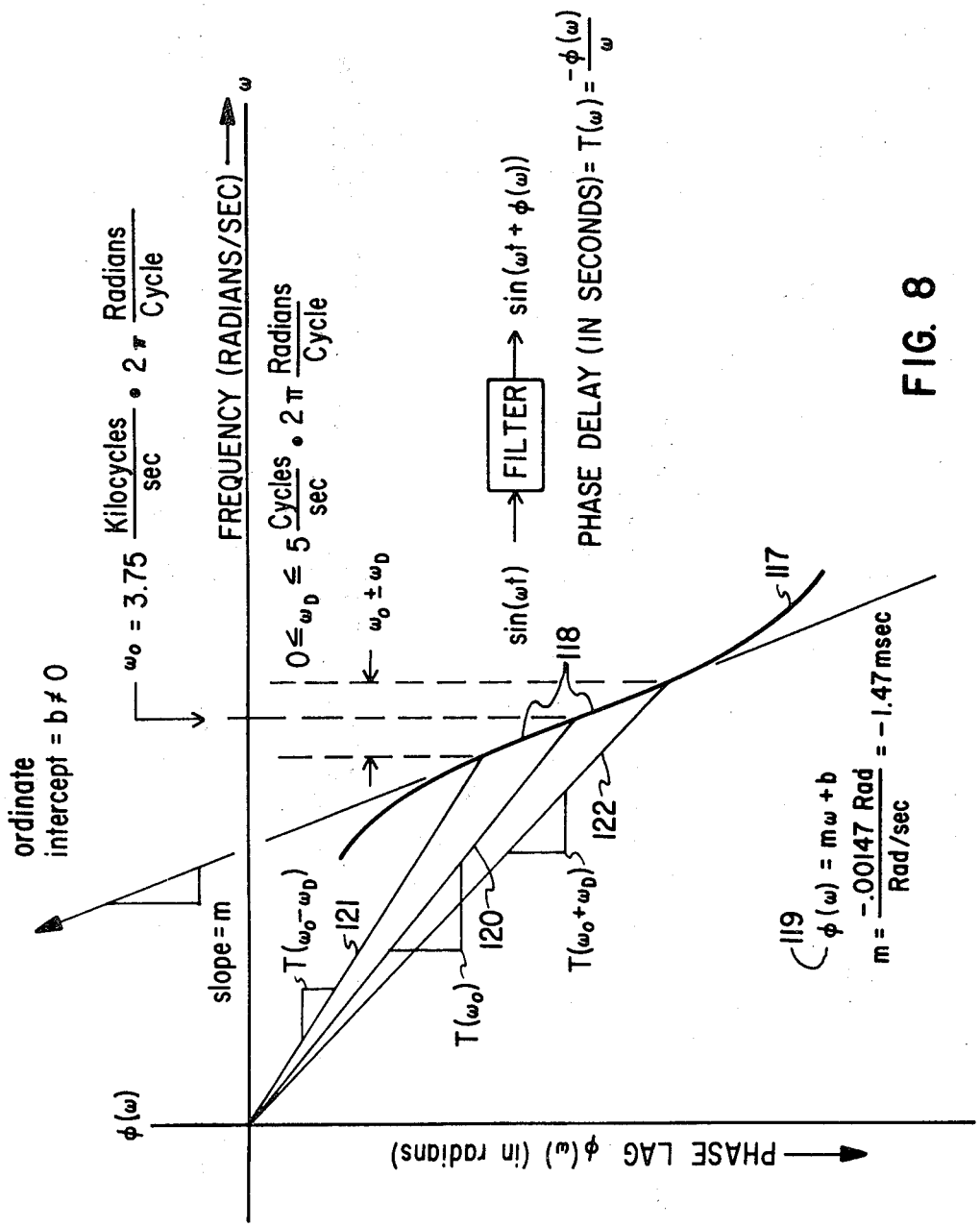
FIG. 8 is a representative plot of the frequency versus phase characteristics of the filter of the receiver/transmitter portion of the block diagram of FIG. 4.

FIG. 8 shows a graph 117 of the phase $\Phi(\omega)$ versus frequency $\omega$ characteristic of the band pass filter 44. That characteristic has a linear region 118 about a center frequency $\omega_0$ of the ideal 3.75 KHz. The linear region 118 includes the frequencies $\omega_0$ plus or minus a doppler frequency $\omega_D$. It has been determined for the present embodiment that $0 \leq \omega_D \leq 5$ Hz. The linear region 118 can be approximated by the equation 119 $\phi(\omega) = m\omega + b$, where m is the slope of the linear region 118 and b is the ordinate intercept. In the present embodiment m equals $-0.00147$ radians over radians per second, or $-1.47$ msec. This value can be obtained either by analysis or by empirical measurement. In the present embodiment b is non-zero.

It is well known that the phase delay T (in seconds) of a filter is given by the relationship $T(\omega) = -\phi(\omega)/\omega$. Thus, the slope of line 120 is the phase delay $T(\omega_0)$ at the center frequency. Similarly, the slope of lines 121 and 122 are the phase delays resulting from the doppler effect for receding and approaching targets, respectively. In the present embodiment m is negative and since $b \neq 0$, $T(\omega_0 - \omega_D) \neq T(\omega_0) \neq T(\omega_0 + \omega_D)$. However, the technique to be described is applicable even if b were zero and each of the phase delays were equal. Alternatively, m could also be positive.

Figure 9A:
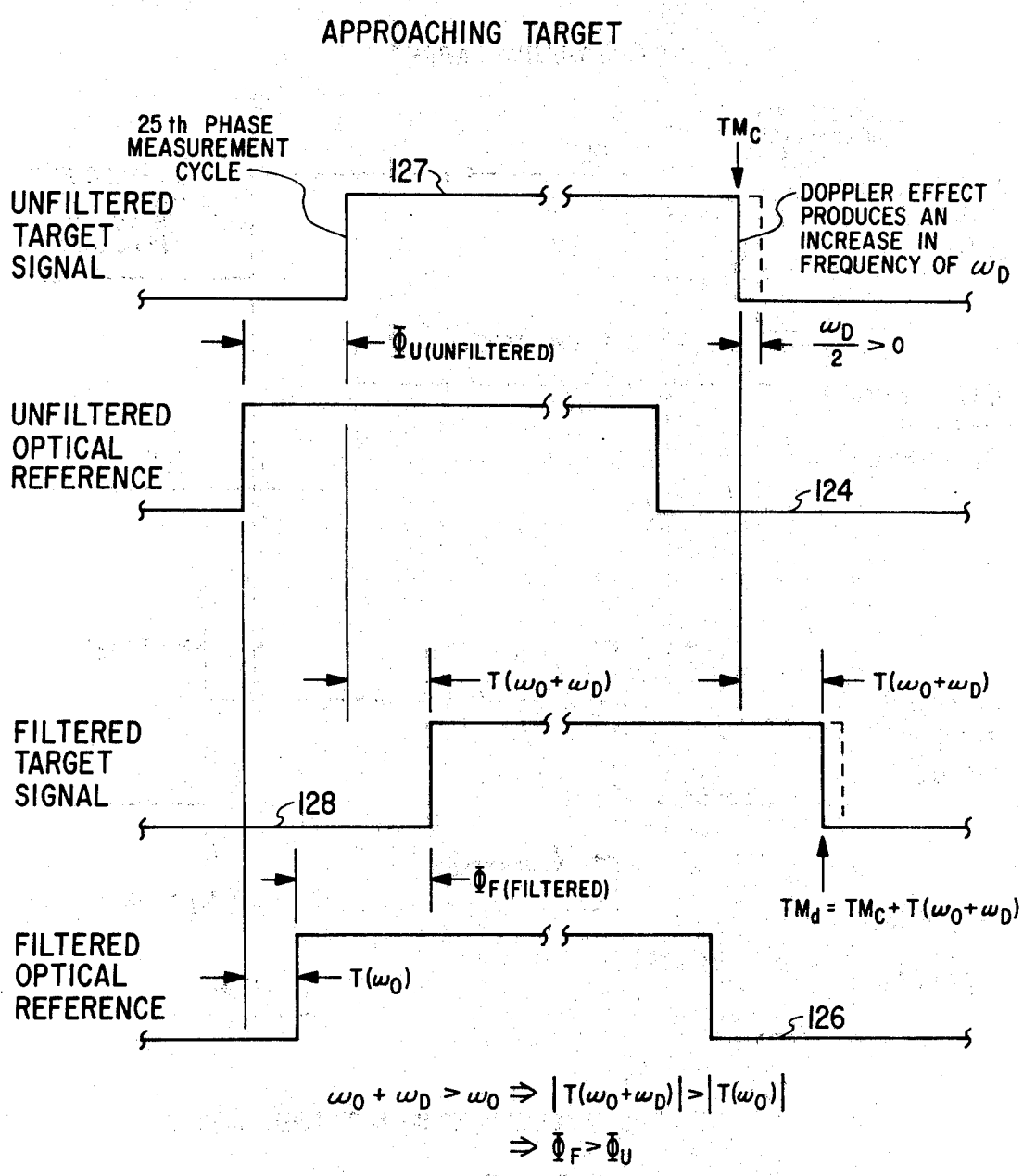
FIGS. 9A-9C illustrate the effect of the filter upon the measuring signals for approaching, stationary, and receding targets, respectively.
Figure 9B:
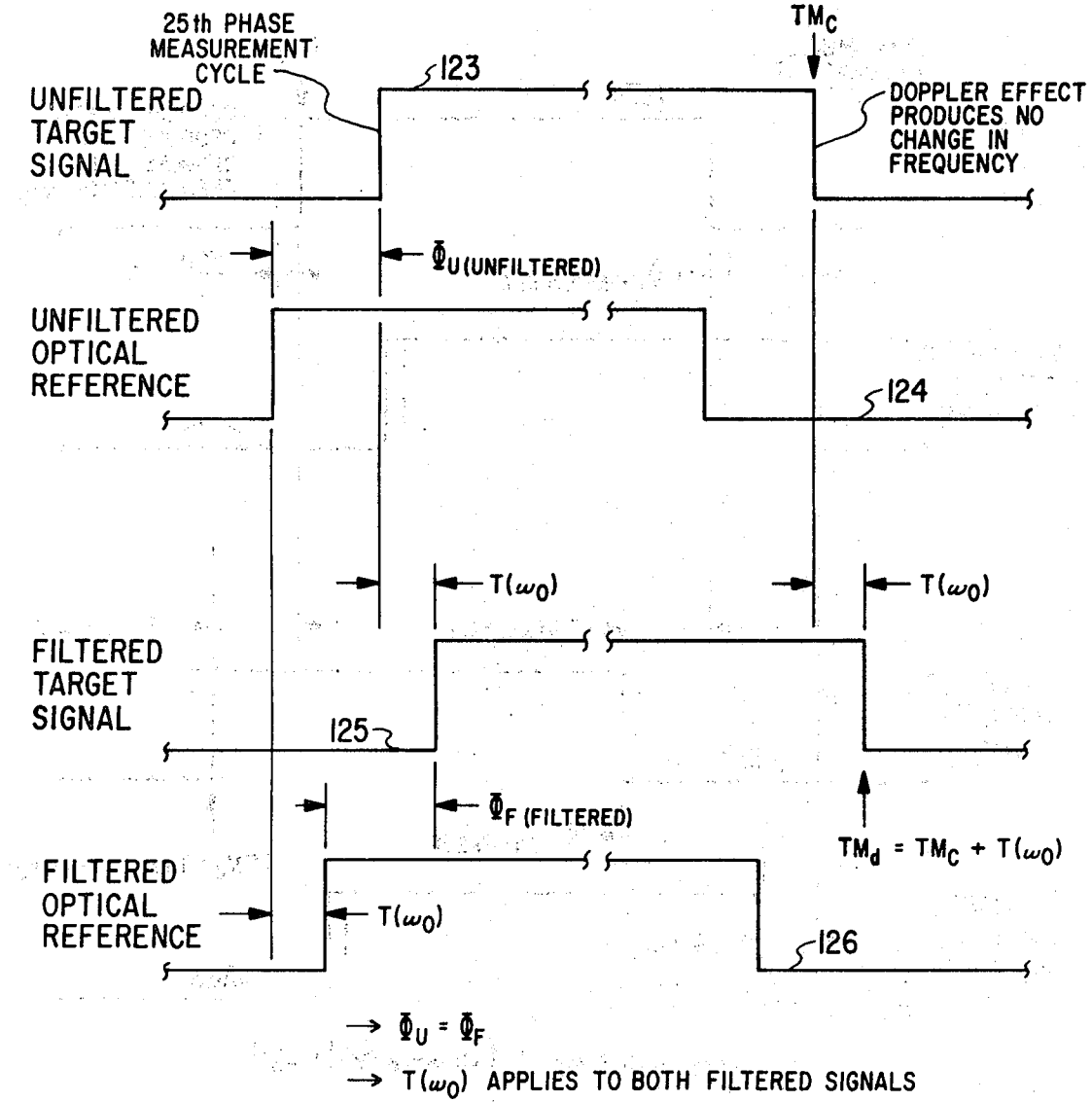
Figure 9C:
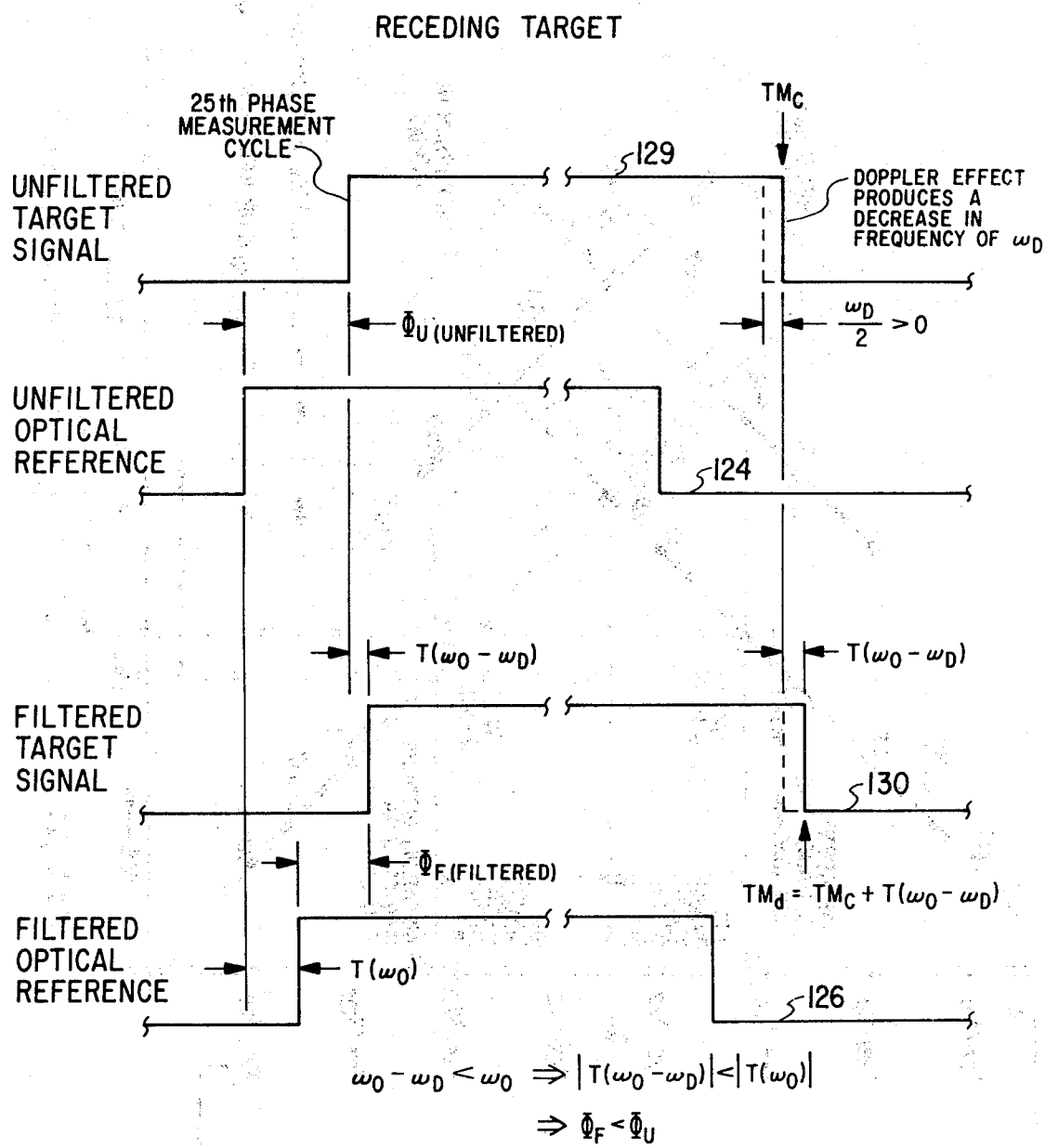

FIGS. 9A through 9C show the effects of the filter characteristics of FIG. 8 for distance meter operation with approaching, stationary, and receding targets, respectively. Referring briefly to FIG. 9B, signal 124 represents the twenty-fifth cycle of the signal 113 of FIG. 6. Similarly signal 123 represents the twenty-fifth cycle of signal 112 of FIG. 6. Signals 125 and 126 correspond respectively to signals 123 and 124. Since the target is stationary there is no doppler effect upon $\omega_0$, and the phase delay for each of signals 123 and 124 are equal. Hence, their phase difference before filtering $\Phi_U$ equals the phase difference $\Phi_F$ after filtering. And, since the target is at rest, any error in $TM_d$ due the presence of phase delay can be ignored. That is, with a stationary target any time mark generated during the measurement is a valid time mark.

FIG. 9A shows the corresponding situation with an approaching target. The doppler effect produces an increase in the frequency of the unfiltered target signal 127. When signal 127 goes through the filter it experiences an increase in phase delay, as compared with signal 124 of FIG. 9B. As a result, the final phase difference $\Phi_F$ after filtering appears greater than the original phase difference $\Phi_U$, producing an apparent increase in distance. Furthermore, the difference between $TM_d$ and $TM_c$ increase as a result of the target approaching the distance meter.

Similarly, FIG. 9C shows the corresponding situation with a receding target. The doppler effect produces a decrease in the frequency of the unfiltered target signal 129. When signal 129 goes through the filter it experiences a decrease in phase delay, as compared with signal 124 of FIG. 9B. As a result the final phase difference $\Phi_F$ after filtering appears less than the original phase difference $\Phi_U$, producing an apparent decrease in distance. Furthermore, the difference between $TM_d$ and $TM_c$ decreases as a result of the target receding from the distance meter.

As mentioned earlier, when measuring the distance to a moving target the distance meter produces an error in both the measured "then" and "there". The "then" error will be referenced to the time $TM_c$ 116 and the "there" error will be referenced to the distance $\overline{X}$ 115, both of FIG. 7. Both errors stem from changes in the phase delay of the target signal owing to the doppler effect and the characteristics of the filter. The error in the "then" is simply the phase delay itself. The error in the "there" stems from difference between the phase delays for the target signal and the reference signal, which causes $\Phi_F$ to be unequal to $\Phi_U$. Both types of error are variable and depend upon the phase delay, which in turn depends upon the direction and speed of the target.

As earlier suggested, the erroneous "there" can be incorporated as the distance portion of the distance/time pair to be supplied for the measurement if a time mark $TM_e$ is generated when the target was actually at that distance. It will be shown below that this can be done by considering the time required for the target to travel the distance that is the error in the measured "there", and adding that time to the time error in the "then". That is, it will be shown that the sum of these two times is the difference between $TM_e$ and $TM_d$.

Furthermore, it will be shown that the sum of those two times is constant, is the magnitude of the slope m of segment 118 of FIG. 8, and applies to both approaching and receding targets.

Now, the phase delay for $\omega_0$ is $$T(\omega_0) = -\left(m + \frac{b}{\omega_0}\right) \quad (1)$$

Similarly, the phase delay for $\omega_0 \pm \omega_D$ is $$T(\omega_0 \pm \omega_D) = -\left(m + \frac{b}{\omega_0 \pm \omega_D}\right) \quad (2)$$

Inasmuch as the distance meter makes phase measurements by measuring the time interval between a pair of rising edges, the difference between $T(\omega_0)$ and $T(\omega_0 \pm \omega_D)$ produces a proportional change in the measured phase. The change in the measured phase accounts for the error in the perceived distance. That is, $$X_{got} - X_{expected} = \frac{\frac{\lambda}{2}\omega_0}{2\pi}[T(\omega_0 \pm \omega_D) - T(\omega_0)] = X_{error} \quad (3)$$

where $\lambda$ is the wavelength in meters per cycle of the target signal and $\omega_0$ is its frequency in radians per second.

Since velocity v of the target is constant the time $T_{xe}$ required for the target to traverse $X_{error}$ is $$T_{xe} = \left|\frac{X_{error}}{V}\right| \text{ where } V = \mp \omega_D \frac{\lambda}{2}/2\pi \quad (4)$$

$T_{xe}$ is the amount of time by which the time mark $TM_e$ must be adjusted from $TM_c$ to mark the time when the target was actually at the perceived distance. The adjustment is always made in the same direction, as explained in the next two paragraphs.

Assuming the target 2 is approaching, the target signal increases in frequency and, in accordance with FIG. 8, experiences an increase in phase delay through the filter. This produces an increase in the measured phase difference $\Phi_F$ for the filtered signals, making the perceived target position appear "further away". Since the target is approaching, "further away" corresponds to "earlier in time" by the amount $T_{xe}$. Thus, $TM_e = TM_c - T_{xe}$.

Assuming the target is receding, the target signal decreases in frequency and, in accordance with FIG. 8, experiences a decrease in phase delay through the filter. This produces a decrease in the measured phase difference $\Phi_F$ for the filtered signals, making the perceived target position appear "closer". Since the target is receding, "closer" correspons to "earlier in time" by the amount $T_{xe}$. Thus, $TM_e = TM_c - T_{xe}$, as in the case for an approaching target.

Unfortunately, $TM_c$ is not readily anticipated since it is a practical necessity to first filter the target and optical reference signals to obtain them as isolated components. What is readily available is $TM_d$, whose corresponding significance was mentioned in connection with FIG. 7. Now, $TM_c = TM_d$-phase delay. Thus, for all moving targets $$TM_e = TM_d - T(\omega_0 \pm \omega_D) - T_{xe} \quad (5)$$

$$TM_d - TM_e = T(\omega_0 \pm \omega_D) + T_{xe} \quad (6)$$

It is the right-hand member of equation (6) that is constant and equal in magnitude to m. Equation (6) represents an error quantity of the form "got" minus "expected". The negative of the difference is to be added to the "got" (i.e., to $TM_d$) to produce a correct result. If the slope of the filter is negative the right-hand member of (6) is always positive.

Substituting equations (1) and (2) into (3) yields an equation (3'). Substituting equation (2) into (6) yields an equation (6'). Substituting equation (3') into (4) yields an equation (4'). Substituting equation (4') into (6') yields (6''):

$$TM_d - TM_e = -m - \frac{b}{\omega_0 \pm \omega_D} + \quad (6'')$$

$$\left|\frac{\frac{\lambda}{2}\omega_0}{2\pi}\left[m + \frac{b}{\omega_0} - m - \frac{b}{\omega_0 \pm \omega_D}\right]\right|$$
$$\overline{\frac{\mp \omega_D \frac{\lambda}{2}}{2\pi}}$$

$$= -m$$

Figure 10:
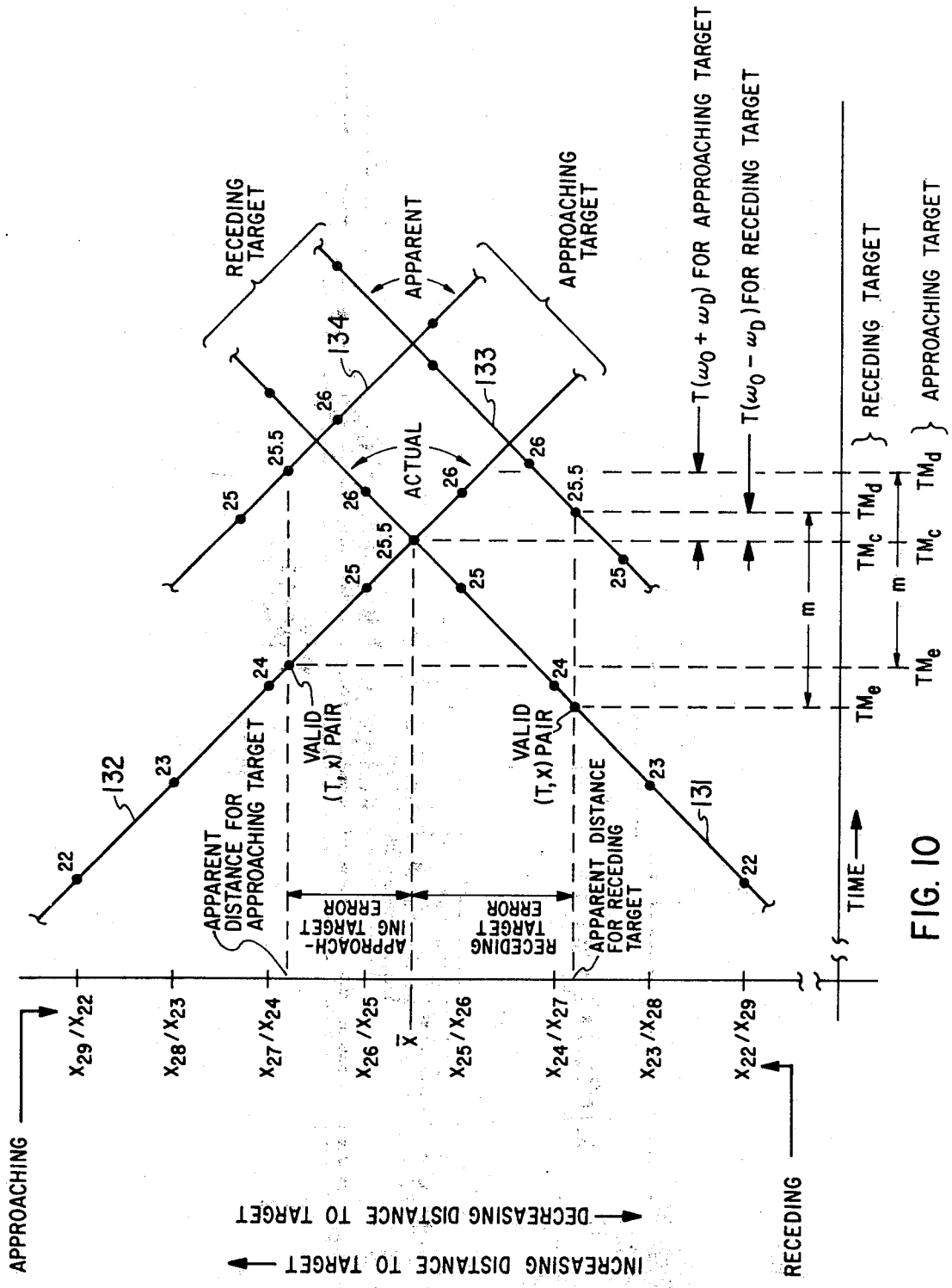
FIG. 10 is a graph of the actual and apparent target positions in time for a moving target.

FIG. 10 graphically illustrates the nature of the correction of $TM_d$ to $TM_e$ for approaching and receding targets. The line 131 denotes the successive actual positions in time of a receding target. The line 132 denotes the successive actual positions in time of an approaching target. The lines 133 and 134 denote the respective successive apparent positions in time after filtering.

The vertical displacement between corresponding successive positions on lines 131 and 133 represents apparent distance error due to the difference between $\Phi_U$ and $\Phi_F$. The horizontal displacement represents the phase delay $T(\omega_0 - \omega_D)$. Similar meanings apply to lines 132 and 134, except that the horizontal displacement represents $T(\omega_0 + \omega_D)$.

The actual target positions in time were chosen to produce the same average $\overline{X}$ at the same time $TM_c$. From the previous argument it is clear that although the $TM_d$ for the receding target occurs earlier than the $TM_d$ for the approaching target, the corresponding $TM_e$ for each is found by adjusting each $TM_d$ by the constant amount m. Since m is negative for the band pass filter 44 the nature of the adjustment is for $TM_e$ to anticipate $TM_d$. In each case this produces valid time-/distance pairs; that is, points upon lines 131 and 132.

In the present embodiment the value of m is $-1.47$ msec. Note that five and one half cycles of the ideal 3.75 KHz target signal is 1.46666 . . . msec. Neglecting the change in target signal frequency produced by the doppler effect, a signal generated after twenty complete cycles of phase comparison would closely approximate anticipating $TM_d$ (which is at twenty-five and a half cycles) by the required 1.47 msec.

Referring again to FIG. 4B, the time mark generator 21 achieves this by connecting the input of a divide by four divider 81 to the output of the divide by ten divider 61, which is turn driven by the output 55 of the zero crossing detector 54. Each of these counters is reset at the onset of the signal DATA WINDOW 62. Thus, the output of the divider 81 produces a transition at the start of the twentieth cycle of each phase measurement for target-time and for reference-time. The desired anticipatory signal TIME MARK 30 is obtained by forming with the AND gate 82 the logical AND of the output of the divider 81 and a signal $\overline{\text{CHOPPER CLOCK}}$.

It will be recognized by those skilled in the art that if the slopes m of the filter 44 were positive, the required adjustment to $TM_e$ would be in the form of a delay following $TM_d$. The signal TIME MARK would then be easily implemented with a delay one shot triggered by $TM_d$. The amount of the delay would be the slope m. At the conclusion of the delay the signal TIME MARK would be issued by another one shot triggered by the falling edge of the delay one shot. Alternatively, one could identify with counters some cycle of the target signal occurring the required delay following $TM_d$, and use its transition to produce the signal TIME MARK.

Figure 11:
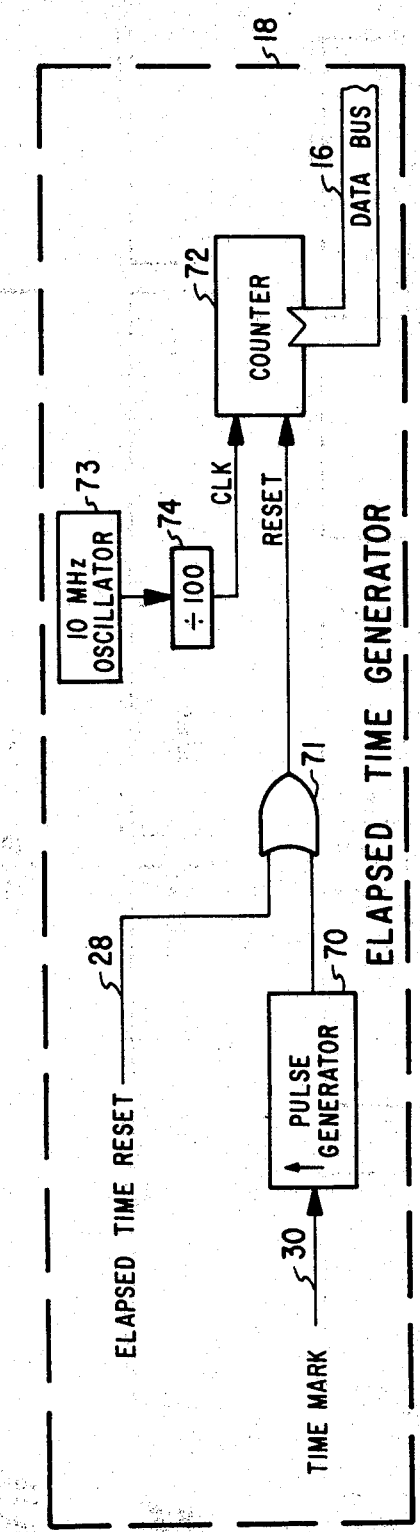
FIG. 11 is a more detailed block diagram of the elapsed time generator portion of the block diagram of FIG. 2.

FIG. 11 shows the elapsed time generator 18 in greater detail. A pulse generator 70 is triggered by the signal TIME MARK 30. The output of the pulse generator 70 is combined with the signal ELAPSED TIME RESET 28 by OR gate 71 whose output resets a counter 72. The counter 72 counts pulses from a divider 74 receiving its input from an oscillator 73. The count in the counter 72 is supplied to the microprocessor 17 via the data bus 16.

Figure 12:
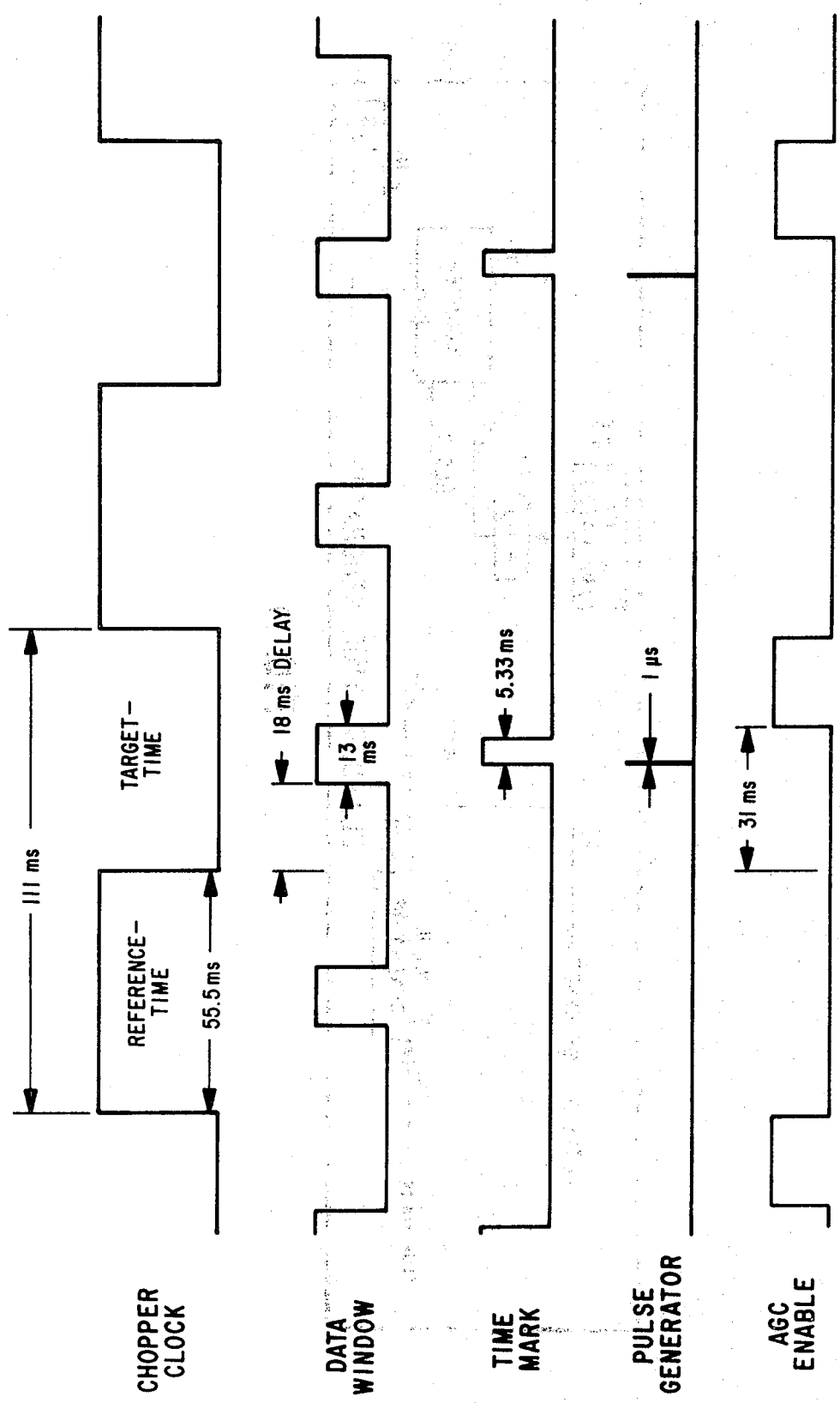
FIG. 12 is a waveform diagram depicting timing relationships between various signals depicted in FIGS. 4A, 4B, 5, and 11.

The operation of the elapsed time generator 18 is as follows. The leading edge of the signal TIME MARK 30 triggers the pulse generator 70 to produce a narrow pulse, as shown by the waveform of FIG. 12 labelled "PULSE GENERATOR". The narrow pulse from the pulse generator 70 resets the counter 72. The counter 72 counts pulses from a 10 MHz oscillator 73 through the divider 74. Normally, counter 72 is reset, as just described, at the time when the moving target 2 is at the distance that will be supplied for the preceeding measurement. Just prior to being reset, the counter 73 will contain a count indicative of the time duration of the previous complete measurement cycle. The count in the counter 72 is available to the microprocessor 17 via the data bus 16. The microprocessor 17 sends the elapsed time data to the controller 5 during distance transducer operation, as described in connection with FIGS. 2 and 3.

The signal ELAPSED TIME RESET 28 can arbitrarily reset the counter 72, so that a time axis generated by accumulating successive elapsed time intervals can be referenced to an external time-frame that begins with an asynchronous event. This is achieved as follows. The asynchronous external event is made to give the signal ELAPSED TIME RESET 28. The counter 72 is reset by the output of the OR gate 71, whose inputs are the output of the pulse generator 70 and the signal ELAPSED TIME RESET 28. In this way, an initial elapsed time indication can be made to represent the time interval between the asynchronous external event causing the reset and the end of the measurement cycle currently in progress. This will usually be a fractional amount of a normal elapsed time value. When the fractional initial elapsed time interval is augmented by succeeding elapsed time intervals, the resulting sum generates a time axis that starts in synchronism with an external asynchronous event. The successive values of the sum are the points in time along the axis when the moving target 2 was at the various distances measured.

We claim:

1. Apparatus for measuring and indicating the varying distance to a moving target and for indicating the instant in real-time when the target is at the indicated distance, the apparatus comprising:
    first means for defining an interval during which a varying distance to a moving target is measured;
    second means coupled to the first means for measuring the varying distance throughout the interval and for then subsequently indicating a distance, the indicated distance separable into at least a first component corresponding to the average distance to the moving target during the interval and a second component which is an error that through a constant K is proportional solely to the relative velocity between the target and the apparatus; and
    time mark generation means coupled to the first means for producing a time mark signal having a transition offset from the middle of the interval by a constant amount determined by the constant of proportionality K, whereby the transition occurs at the instant in real-time when the varying distance to the target equals the indicated distance.

2. Apparatus as in claim 1 wherein the second means measures the varying distance by phase comparison between a signal that is transmitted to the moving target and a signal that is reflected from the moving target.

3. Apparatus as in claim 2 wherein the interval defined by the first means represents an integral number of phase comparisons.

4. Apparatus as in claim 2 wherein the second means includes a filter for rejecting signals other than those within a preselected frequency band about the signals whose phases are to be compared and wherein the second component arises through a linearly varying phase shift by the filter of doppler shifted signals reflected from the moving target.

5. Apparatus for measuring and indicating the varying distance to a moving target and for indicating the value in time when the target is at the indicated distance, the apparatus comprising:
    first means for defining an interval during which a varying distance to a moving target is measured;
    second means coupled to the first means for measuring the varying distance throughout the interval and for then subsequently indicating a distance, the indicated distance separable into at least a first component corresponding to the average distance to the moving target during the interval and a second component which is an error that through a constant K is proportional solely to the relative velocity between the target and the apparatus;
    time mark generation means coupled to the first means for producing a time mark signal having a transition offset from the middle of the interval by a constant amount determined by the constant of proportionality K; and
    time keeping means coupled to the time mark signal for maintaining with respect to an origin on a time axis a monotonically increasing indication of time, and for capturing and outputting the value of the time indication present upon the occurrence of the transition in the time mark signal, whereby that captured time value indicates the value in time when the varying distance to the moving target equals the indicated distance.

6. Apparatus as in claim 5 wherein the second means measures the varying distance by phase comparison between a signal that is transmitted to the moving target and a signal that is reflected from the moving target.

7. Apparatus as in claim 6 wherein the interval defined by the first means represents an integral number of phase comparisons.

8. Apparatus as in claim 6 wherein the second means includes a filter for rejecting signals other than those within a preselected frequency band about the signals whose phases are to be compared and wherein the second component arises through a linearly varying phase shift by the filter of doppler shifted signals reflected from the moving target.

9. Apparatus as in claim 5 wherein the time keeping means further comprises means for arbitrarily resetting to zero the monotonically increasing indication of time, whereby the origin of the time axis can be made to correspond to an arbitrary instant in real-time.

10. Apparatus for measuring and indicating the distance to a moving target and for indicating the instant in real-time when the target is at the indicated distance, the apparatus comprising:

means for producing a reference signal having a reference frequency;

means coupled to the reference signal for transmitting to a target a carrier incorporating the reference frequency;

means for receiving a return signal reflected from the target and for producing therefrom a received return signal having a phase relative to the reference frequency in relation to the distance to the target and having a frequency different from the reference frequency by a doppler shift in relation to the relative motion between the apparatus and the target;

means coupled to the received return signal for producing therefrom a conditioned return signal in preparation for phase measurement, this same means also altering the phase of the conditioned return signal in proportion to the doppler shift;

means coupled to the conditioned return signal for generating a measurement interval signal defining a measurement interval;

means coupled to the measurement interval signal, to the reference signal and to the conditioned return signal for producing an indication of the distance to the target according to a phase difference measured during the measurement interval, the indication being separable into at least first and second components of which the first corresponds to the average distance to the target during the measurement interval and the second is an error corresponding to the alteration in the phase of the return signal owing to the doppler shift produced by the relative motion; and means coupled to the measurement interval signal for generating a time mark signal that compensates for the error of the second component by having a transition offset from the middle of the measurement interval by an amount proportional to the rate of phase change in the conditioned return signal per unit of doppler shift in the return signal, whereby the transition occurs at the instant in real-time when the varying distance to the moving target equals the indicated distance.

11. Apparatus as in claim 10 wherein the carrier incorporating the reference frequency is electromagnetic energy modulated by the reference frequency.

12. Apparatus as in claim 11 wherein the electromagnetic energy modulated by the reference frequency is intensity modulated infrared light.

13. Apparatus as in claim 10 wherein the means that produces the conditioned return signal comprises a filter for rejecting frequencies outside of a preselected band about the reference frequency and further wherein the filter acts as a linear phase filter for frequencies within the preselected band.

14. Apparatus as in claim 13 wherein the phase difference measured during the measurement interval includes an inherent portion induced by an inherent phase delay through the filter at the reference frequency, wherein the magnitude of the inherent portion is determined by measuring a nonvarying distance of known length, and wherein the determined inherent portion of the phase difference is removed before it contributes to the indicated distance.

15. Apparatus for measuring and indicating the distance to a moving target and for indicating the value in time when the target is at the indicated distance, the apparatus comprising:

means for producing a reference signal having a reference frequency;

means coupled to the reference signal for transmitting to a target a carrier incorporating the reference frequency;

means for receiving a return signal reflected from the target and for producing therefrom a received return signal having a phase relative to the reference frequency in relation to the distance on the target and having a frequency different from the reference frequency by a doppler shift in relation to the relative motion between the apparatus and the target;

means coupled to the received return signal for producing therefrom a conditioned return signal in preparation for phase measurement, this same means also altering the phase of the conditioned return signal in proportion to the doppler shift;

means coupled to the conditioned return signal for generating a measurement interval signal defining a measurement interval;

means coupled to the measurement interval signal, to the reference signal and to the conditioned return signal for producing an indication of the distance to the target according to a phase difference measured during the measurement interval, the indication being separable into at least first and second components of which the first corresponds to the average distance to the target during the measurement interval and the second is an error corresponding to the alteration in the phase of the return signal owing to the doppler shift produced by the relative motion;

means coupled to the measurement interval signal for generating a time mark signal having a transition offset from the middle of the measurement interval by an amount proportional to the rate of phase change in the conditioned return signal per unit of doppler shift in the return signal; and time keeping means coupled to the time mark signal for maintaining with respect to an origin on a time axis a monotonically increasing indication of time, and for capturing and outputting the value of the time indication present upon the occurrence of the transition in the time mark signal, whereby that captured time value indicates the value in time when the varying distance to the moving target equals the indicated distance.

16. Apparatus as in claim 15 wherein the carrier incorporating the reference frequency is electromagnetic energy modulated by the reference frequency.

17. Apparatus as in claim 16 wherein the electromagnetic energy modulated at the reference frequency is intensity modulated infrared light.

18. Apparatus as in claim 15 wherein the means that produces the conditioned return signal comprises a filter for rejecting frequencies outside of a preselected band about the reference frequency and further wherein the filter acts as a linear phase filter for frequencies within the preselected band.

19. Apparatus as in claim 18 wherein the phase difference measured during the measurement interval includes an inherent portion induced by an inherent phase delay through the filter at the reference frequency, wherein the magnitude of the inherent portion is determined by measuring a nonvarying distance of known length, and wherein the determined inherent portion of the phase difference is removed before it contributes to the indicated distance.

20. Apparatus as in claim 15 wherein the time keeping means further comprises means for arbitrarily resetting to zero the monotonically increasing indication of time, whereby the origin of the time axis can be made to correspond to an arbitrary instant in real-time.

21. Apparatus for measuring and indicating the distance to a moving target and for indicating the instant in real-time when the target is at the indicated distance, the apparatus comprising:

means for producing a measurement signal;

means coupled to the measurement signal for modulating a carrier signal therewith and for transmitting that modulated carrier to a target;

means for receiving a return signal that has been reflected from the target, has modulation whose phase relative to the measurement signal is in relation to the distance to the target, and that has modulation differing in frequency from the measurement signal by a doppler shift in relation to the relative motion between the target and the apparatus;

means for producing a control signal defining reference measurement intervals in alternate succession with target measurement intervals;

mixer means coupled to the measurement signal, to the return signal and to the control signal for producing at a mixer means output heterodyned signals that include a reference component during reference measurement intervals and a target component during target measurement intervals, the phase difference between those components corresponding to the phase difference between the measurement signal and the return signal;

filter means coupled to the mixer means output for extracting the reference component from the heterodyned signals during reference measurement intervals to produce a reference path signal at a heterodyne beat frequency and for extracting the target component from the heterodyned signals during target measurement intervals to produce a target path signal whose frequency is the heterodyne beat frequency changed by the doppler shift;

the filter means imparting to the reference path signal a fixed phase delay of time D and imparting to the target path signal a variable phase delay of time D+V where V is proportional to the doppler shift;

means coupled to the control signal and to the reference and target path signals for generating a phase measurement signal defining reference and target periods each coincident with integral numbers of cycles of the reference and target path signals, respectively;

means for producing an internal reference signal at the frequency of the reference path signal;

means coupled to the phase measurement signal, to the reference and target path signals and to the internal reference signal, for accumulating during reference periods a time $\Sigma T_R$ that is the sum of individual $T_R$'s each of which are time intervals between corresponding zero crossings of the internal reference signal and the reference path signal and for accumulating during target periods a time $\Sigma T_T$ that is the sum of individual $T_T$'s each of which are time intervals between corresponding zero crossings of the internal reference signal and the target path signal, $\Sigma T_T$ being separable into at least first and second components of which the first corresponds to N times the average distance to the target during the associated target period and the second is N times an error $\Delta$ proportional to the variation V in the phase delay owing to the doppler shift, where N is the number of $T_T$'s in the accumulated sum $\Sigma T_T$;

means coupled to $\Sigma T_R$ and $\Sigma T_T$ to produce the difference therebetween and convert that difference into an indicated distance between the target and the apparatus; and time mark generation means coupled to the measurement signal for producing a time mark signal having a transition offset from the middle of the target period by a constant amount of time equal to the variable phase delay D +V plus the error $\Delta$, whereby the transition indicates the instant in real-time when the distance to the moving target equals the indicated distance.

22. Apparatus as in claim 21 wherein the modulated carrier transmitted to the target is intensity modulated infrared light.

23. Apparatus for measuring and indicating the distance to a moving target and for indicating the value in time when the target is at the indicated distance, the apparatus comprising:

means for producing a measurement signal;

means coupled to the measurement signal for modulating a carrier signal therewith and for transmitting that modulated carrier to a target;

means for receiving a return signal that has been reflected from the target, has modulation whose phase relative to the measurement signal is in relation to the distance to the target, and that has modulation differing in frequency from the measurement signal by a doppler shift in relation to the relative motion between the target and the apparatus;

means for producing a control signal defining reference measurement intervals in alternate succession with target measurement intervals;

mixer means coupled to the measurement signal, to the return signal and to the control signal for producing at a mixer means output heterodyned signals that include a reference component during reference measurement intervals and a target component during target measurement intervals, the phase difference between those components corresponding to the phase difference between the measurement signal and the return signal;

filter means coupled to the mixer means output for extracting the reference component from the heterodyned signals during reference measurement intervals to produce a reference path signal at a heterodyne beat frequency and for extracting the target component from the heterodyned signals during target measurement intervals to produce a target path signal whose frequency is the heterodyne beat frequency changed by the doppler shift;

the filter means imparting to the reference path signal a fixed phase delay of time D and imparting to the target path signal a variable phase delay of time D+V where V is proportional to the doppler shift;

means coupled to the control signal and to the reference and target path signals for generating a phase measurement signal defining reference and target periods each coincident with integral numbers of cycles of the reference and target path signals, respectively;

means for producing an internal reference signal at the frequency of the reference path signal;

means coupled to the phase measurement signal, to the reference and target path signals and to the internal reference signal, for accumulating during reference periods a time $\Sigma T_R$ that is the sum of individual $T_R$'s each of which are time intervals between corresponding zero crossings of the internal reference signal and the reference path signal and for accumulating during target periods a time $\Sigma T_T$ that is the sum of individual $T_T$'s each of which are time intervals between corresponding zero crossings of the internal reference signal and the target path signal, $\Sigma T_T$ being separable into at least first and second components of which the first corresponds to N times the average distance to the target during the associated target period and the second is N times an error $\Delta$ proportional to the variation V in the phase delay owing to the doppler shift, where N is the number of $T_T$'s in the accumulated sum $\Sigma T_T$;

means coupled to $\Sigma T_R$ and $\Sigma T_T$ to produce the difference therebetween and convert that difference into an indicated distance between the target and the apparatus;

time mark generation means coupled to the measurement signal for producing a time mark signal having a transition offset from the middle of the target period by a constant amount of time equal to the variable phase delay D +V plus the error $\Delta$; and time keeping means coupled to the time mark signal for maintaining with respect to an origin on a time axis a monotonically increasing indication of time, and for capturing and outputting the value of the time indication present upon the occurrence of the transition in the time mark signal, whereby that output time value indicates the value in time when the distance to the moving target equals the indicated distance.

24. Apparatus as in claim 23 wherein the modulated carrier transmitted to the target is intensity modulated infrared light.

25. Apparatus as in claim 23 wherein the time keeping means further comprises means for arbitrarily resetting to zero the monotonically increasing indication of time, whereby the origin of the time axis can be made to correspond to an arbitrary instant in real-time.

26. A method of measuring and indicating a distance X to a moving target and for indicating the instant in real-time when X equals the distance to the moving target, the method comprising the steps of:

transmitting a signal to the target;

receiving a signal that is reflected from the target and whose frequency is changed by a doppler shift;

filtering the reflected signal, the filtered signal exhibiting a phase delay that is proportional to its frequency;

measuring the phase of the filtered signal relative to the signal transmitted to the target;

converting the measured phase into a distance X separable into at least a first component corresponding to the average distance to the target during the measuring step and an error component produced by a shift in phase resulting from a change in the phase delay of the filtering step that in turn resulted from the doppler shift in the frequency of the reflected signal; and generating a time mark signal having a transition offset by a constant amount from the midpoint in time of the measuring step, that constant amount proportional to the rate by which the phase delay of the filtering step changes as a function of frequency, whereby the transition in the time mark signal occurs at the instant in real-time when the distance to the moving target is X.

27. A method of producing an (X,T) pair for a moving target where X is the distance to that target and T is the value in time when X is the distance to the target, the method comprising the steps of:

transmitting a signal to the target;

receiving a signal that is reflected from the target and whose frequency is changed by a doppler shift;

filtering the reflected signal, the filtered signal exhibiting a phase delay that is proportional to its frequency;

measuring the phase of the filtered signal relative to the signal transmitted to the target;

converting the measured phase into a distance X separable into at least a first component corresponding to the average distance to the target during the measuring step and an error component produced by a shift in phase resulting from a change in the phase delay of the filtering step that in turn resulted from the doppler shift in the frequency of the reflected signal; and determining a value T according to the point along a time axis that corresponds to an offset by a constant amount from the midpoint in time of the measuring step, that constant amount proportional to the rate by which the phase delay of the filtering step changes as a function of frequency, whereby T is the value in time when the distance to the moving target is X.

* * * * *

UNITED STATES PATENT AND TRADEMARK OFFICE
CERTIFICATE OF CORRECTION

PATENT NO. : 4,453,825
DATED : June 12, 1984
INVENTOR(S) : Dean C. Buck et al.

It is certified that error appears in the above-identified patent and that said Letters Patent is hereby corrected as shown below:

Column 4, line 19, "althugh" should be --although--;

Column 5, line 5, "dsecribed" should be --described--;

Column 5, line 27, "fro" should be --for--;

Column 6, line 33, "In the 400 meters" should be --In the 400 meter--;

Column 7, line 56, "receive" should be --receiver--;

Column 8, line 39, "unaccounted, for," should be --unaccounted for,--;

Column 15, line 48, "$\Phi(\omega)$" should be --$\phi(\omega)$--;

In the Claims:

Line 13 of Claim 15, "distance on the" should be --distance to the--;

Signed and Sealed this

Thirteenth Day of November 1984

[SEAL]

Attest:

Attesting Officer

GERALD J. MOSSINGHOFF

Commissioner of Patents and Trademarks